United States Patent
Kim

(10) Patent No.: US 10,902,173 B2
(45) Date of Patent: Jan. 26, 2021

(54) SYSTEM FOR DESIGNING INTEGRATED CIRCUIT USING EXTRACTED MODEL PARAMETER AND METHOD OF MANUFACTURING INTEGRATED CIRCUIT USING THE SAME

(71) Applicant: Samsung Electronics Co., Ltd., Suwon-si (KR)

(72) Inventor: Yo-han Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/439,115

(22) Filed: Jun. 12, 2019

(65) Prior Publication Data

US 2020/0004911 A1 Jan. 2, 2020

(30) Foreign Application Priority Data

Jun. 29, 2018 (KR) .......................... 10-2018-0075658

(51) Int. Cl.
*G06F 30/392* (2020.01)
*G06F 30/20* (2020.01)
*G06F 30/30* (2020.01)
*G06F 119/18* (2020.01)

(52) U.S. Cl.
CPC ............ *G06F 30/392* (2020.01); *G06F 30/20* (2020.01); *G06F 30/30* (2020.01); *G06F 2119/18* (2020.01)

(58) Field of Classification Search
USPC ........................................................ 716/119
See application file for complete search history.

(56) References Cited

U.S. PATENT DOCUMENTS

| | | | |
|---|---|---|---|
| 7,640,143 B2 | 12/2009 | Bittner et al. | |
| 8,380,479 B2 | 2/2013 | Hatanaka | |
| 2008/0195983 A1* | 8/2008 | Chidambarrao | G06F 30/39 716/132 |
| 2016/0063157 A1 | 3/2016 | Huang et al. | |
| 2016/0342719 A1 | 11/2016 | Reid | |
| 2016/0378717 A1* | 12/2016 | Reid | G06F 11/3409 703/2 |
| 2020/0004911 A1* | 1/2020 | Kim | G06F 30/20 |

FOREIGN PATENT DOCUMENTS

| | | |
|---|---|---|
| JP | 2000/293566 A | 10/2000 |
| JP | 2010/067830 A | 3/2010 |
| JP | 2010/278149 A | 12/2010 |

* cited by examiner

*Primary Examiner* — Mohammed Alam
(74) *Attorney, Agent, or Firm* — Harness, Dickey & Pierce, P.L.C.

(57) ABSTRACT

A method of manufacturing an integrated circuit in which a semiconductor device is provided includes simulating electrical characteristics of the semiconductor device according to a received process variable, by using a model parameter file including a plurality of model parameters, generating semiconductor device layout data based on a result of the simulation, and manufacturing the integrated circuit according to a semiconductor device layout based on the semiconductor device layout data, wherein the plurality of model parameters are stored in the model parameter file in a form of at least one function regarding the process variable.

20 Claims, 16 Drawing Sheets

FIG. 9A

| Model Parameter Set Files for Individual Components | | | |
|---|---|---|---|
| A set<br>A < P1 >= Ga<br>A < P2 >= Ga2<br>A < P3 >= Ga3<br>⋮<br>A < Pn >= Gan | B set<br>B < P1 >= Gb<br>B < P2 >= Gb2<br>B < P3 >= Gb3<br>⋮<br>B < Pn >= Gbn | C set<br>C < P1 >= Gc<br>C < P2 >= Gc2<br>C < P3 >= Gc3<br>⋮<br>C < Pn >= Gcn | D set<br>D < P1 >= Gd<br>D < P2 >= Gd2<br>D < P3 >= Gd3<br>⋮<br>D < Pn >= Gdn |
| E set<br>E < P1 >= Ge<br>E < P2 >= Ge2<br>E < P3 >= Ge3<br>⋮<br>E < Pn >= Gen | F set<br>F < P1 >= Gf<br>F < P2 >= Gf2<br>F < P3 >= Gf3<br>⋮<br>F < Pn >= Gfn | H set<br>H < P1 >= Gh<br>H < P2 >= Gh2<br>H < P3 >= Gh3<br>⋮<br>H < Pn >= Ghn | G set<br>G < P1 >= Gg<br>G < P2 >= Gg2<br>G < P3 >= Gg3<br>⋮<br>G < Pn >= Ggn |

FIG. 9B

Example of Regression Formula $$\hat{G} = p_0 + p_1 \cdot \frac{1}{PV1} + p_2 \cdot \frac{1}{PV2} + p_3 \cdot \frac{1}{PV1 \cdot PV2}$$

Model Parameter Files with Regression Formular $$\text{Bin.0} \langle P1 \rangle = \left[\left(\frac{Ga}{L2 \times W2}\right) - \left(\frac{Go}{L1 \times W2}\right) + \left(\frac{Gc}{L1 \times W1}\right) - \left(\frac{Gd}{L2 \times W1}\right)\right] \times \frac{1}{\left(\frac{1}{L1} - \frac{1}{L2}\right) \times \left(\frac{1}{W1} - \frac{1}{W2}\right)} + \left[\left(\frac{Ga-Gb}{W2}\right) - \left(\frac{Gd-Gc}{W1}\right)\right] \times \frac{1}{L1} \times \frac{1}{\left(\frac{1}{L1} - \frac{1}{L2}\right)} + \left[\left(\frac{Ga-Gd}{L2}\right) - \left(\frac{Gb-Gc}{L1}\right)\right] \times \frac{1}{W} + \frac{Ga - Gb + Gc - Gd}{\left(\frac{1}{L1} - \frac{1}{L2}\right) \times \left(\frac{1}{W1} - \frac{1}{W2}\right)} \times \frac{1}{W \times L}$$

$$\text{Bin.1} \langle P1 \rangle = \left[\left(\frac{Ga}{L3 \times W2}\right) - \left(\frac{Gb}{L2 \times W2}\right) + \left(\frac{Gf}{L2 \times W1}\right) - \left(\frac{Gc}{L3 \times W1}\right)\right] \times \frac{1}{\left(\frac{1}{L2} - \frac{1}{L3}\right) \times \left(\frac{1}{W1} - \frac{1}{W2}\right)} + \left[\left(\frac{Gb-Gc}{W2}\right) - \left(\frac{Gd-Gf}{L3}\right)\right] \times \frac{1}{L1} \times \frac{1}{\left(\frac{1}{L2} - \frac{1}{L3}\right)} + \left[\left(\frac{Gb-Gc}{L3}\right) - \left(\frac{Gs-Gf}{L2}\right)\right] \times \frac{1}{W} + \frac{Gb - Gs + Gf - Gc}{\left(\frac{1}{L2} - \frac{1}{L3}\right) \times \left(\frac{1}{W1} - \frac{1}{W2}\right)} \times \frac{1}{W \times L}$$

$$\text{Bin.2} \langle P1 \rangle = \left[\left(\frac{Gd}{L3 \times W1}\right) - \left(\frac{Gf}{L1 \times W1}\right) + \left(\frac{Gg}{L1 \times W3}\right) - \left(\frac{Gh}{L3 \times W3}\right)\right] \times \frac{1}{\left(\frac{1}{L1} - \frac{1}{L3}\right) \times \left(\frac{1}{W3} - \frac{1}{W1}\right)} + \left[\left(\frac{Gh-Gf}{W1}\right) - \left(\frac{Gd-Gg}{L1}\right)\right] \times \frac{1}{L1} \times \frac{1}{\left(\frac{1}{L2} - \frac{1}{L3}\right)} + \left[\left(\frac{Gd-Gh}{L3}\right) - \left(\frac{Gf-Gg}{L1}\right)\right] \times \frac{1}{W} + \frac{Gd - Gf + Gg - Gh}{\left(\frac{1}{L1} - \frac{1}{L3}\right) \times \left(\frac{1}{W3} - \frac{1}{W1}\right)} \times \frac{1}{W \times L}$$

FIG. 9C

Model Parameter Files with Regession Formular

Bin.0 set
Bin.0 < P1 >= Gb0(PV1, PV2)
Bin.0 < P2 >= Gb02(PV1, PV2)
Bin.0 < P3 >= Gb03(PV1, PV2)
...
Bin.0 < Pn >= Gb0n(PV1, PV2)

Bin.1 set
Bin.1 < P1 >= Gb1(PV1, PV2)
Bin.1 < P2 >= Gb12(PV1, PV2)
Bin.1 < P3 >= Gb13(PV1, PV2)
...
Bin.1 < Pn >= Gb1n(PV1, PV2)

Bin.2 set
Bin.2 < P1 >= Gb2(PV1, PV2)
Bin.2 < P2 >= Gb22(PV1, PV2)
Bin.2 < P3 >= Gb23(PV1, PV2)
...
Bin.2 < Pn >= Gb2n(PV1, PV2)

SYSTEM FOR DESIGNING INTEGRATED CIRCUIT USING EXTRACTED MODEL PARAMETER AND METHOD OF MANUFACTURING INTEGRATED CIRCUIT USING THE SAME

CROSS-REFERENCE TO RELATED APPLICATION

This U.S. non-provisional application claims the benefit of priority under 35 U.S.C. § 119 to Korean Patent Application No. 10-2018-0075658, filed on Jun. 29, 2018, in the Korean Intellectual Property Office (KIPO), the disclosure of which is incorporated herein in its entirety by reference.

BACKGROUND

Various example embodiments of the inventive concepts relate to a computing system for designing an integrated circuit by analyzing characteristics of a semiconductor device based on an extracted model parameter, an apparatus thereof, a method of manufacturing an integrated circuit using the computing system, and/or a non-transitory computer readable medium thereof.

As high integration and miniaturization of semiconductor devices have progressed, factors in processes for designing and manufacturing a semiconductor device have been combined, which causes various unintended electrical characteristics of the semiconductor device. Therefore, in order to overcome the limitations in semiconductor processes and devices, to appreciate phenomena, and to reduce experimental costs, demand for a semiconductor industry for a technology computer aided design (TCAD) process-device simulation environment based on a physical simulation has been increasing. Also, in order to provide precise specifications of a semiconductor device product, there is a need for predicting and simulating characteristics of the semiconductor device.

SUMMARY

Various example embodiments of the inventive concepts provide a computing system for designing an integrated circuit, the computing system being capable of precisely predict electrical characteristics of a semiconductor device included in the integrated circuit by reflecting different processing conditions for manufacturing the semiconductor device, an apparatus thereof, a method of manufacturing an integrated circuit by using the computing system, and/or a non-transitory computer readable medium thereof.

According to an aspect of at least one example embodiment of the inventive concepts, there is provided a method of manufacturing an integrated circuit, in which a semiconductor device is provided, the method including: simulating, using at least one processor, characteristics of the semiconductor device according to at least one received process variable, using a model parameter file including a plurality of model parameters, the plurality of model parameters corresponding to a function associated with the at least one process variable; generating, using the at least one processor, semiconductor device layout data based on a result of the simulation; and manufacturing the integrated circuit according to a semiconductor device layout based on the semiconductor device layout data.

According to another aspect of at least one example embodiment of the inventive concepts, there is provided a method of manufacturing an integrated circuit, the method including: generating, using at least one processor, a model parameter file including a plurality of model parameters based on results of modeling a semiconductor device included in the integrated circuit, the generating the model parameter file including receiving first characteristic data of a first semiconductor device, the first characteristic data corresponding to a first internal condition of the first semiconductor device, receiving second characteristic data of a second semiconductor device, the second characteristic data corresponding to a second internal condition of the second semiconductor device, extracting a plurality of first point model parameters corresponding to the first internal condition, extracting a plurality of second point model parameters corresponding to the second internal condition based on the first internal condition, the second internal condition, a value of the first characteristic data, and a value of the second characteristic data, and calculating interval model parameters corresponding to an interval between the first internal condition and the second internal condition based on the plurality of first point model parameters and the plurality of second point model parameters; simulating, using the at least one processor, characteristics of the semiconductor device according to a received process variable based on the model parameter file; generating, using the at least one processor, semiconductor device layout data based on a result of the simulation; and manufacturing the integrated circuit according to a semiconductor device layout based on the semiconductor device layout data.

According to another aspect of at least one example embodiment of the inventive concepts, there is provided a computing system for designing an integrated circuit, the computing system including: a memory configured to store a circuit simulation program for extracting characteristics of a semiconductor device included in the integrated circuit, and a model parameter file including a plurality of model parameters, the plurality of model parameters including a plurality of point model parameters that are constants and a plurality of interval model parameters provided as functions related to at least one process variable; and at least one processor configured to access the memory and to execute the circuit simulation program, the circuit simulation program causing the at least one processor to, receive information related to the at least one process variable, determine a model parameter corresponding to a value of the at least one process variable from the model parameter file, and output characteristic data including characteristics of the semiconductor device based on the determined model parameter.

BRIEF DESCRIPTION OF THE DRAWINGS

Example embodiments of the inventive concepts will be more clearly understood from the following detailed description taken in conjunction with the accompanying drawings in which:

FIGS. 9A to 9C are diagrams for describing a process of extracting point model parameters and a process of extracting interval model parameters of FIG. 5 at least one example embodiment;

DETAILED DESCRIPTION

Hereinafter, one or more example embodiments of the inventive concepts will be described in detail with reference to accompanying drawings.

Figure 1:
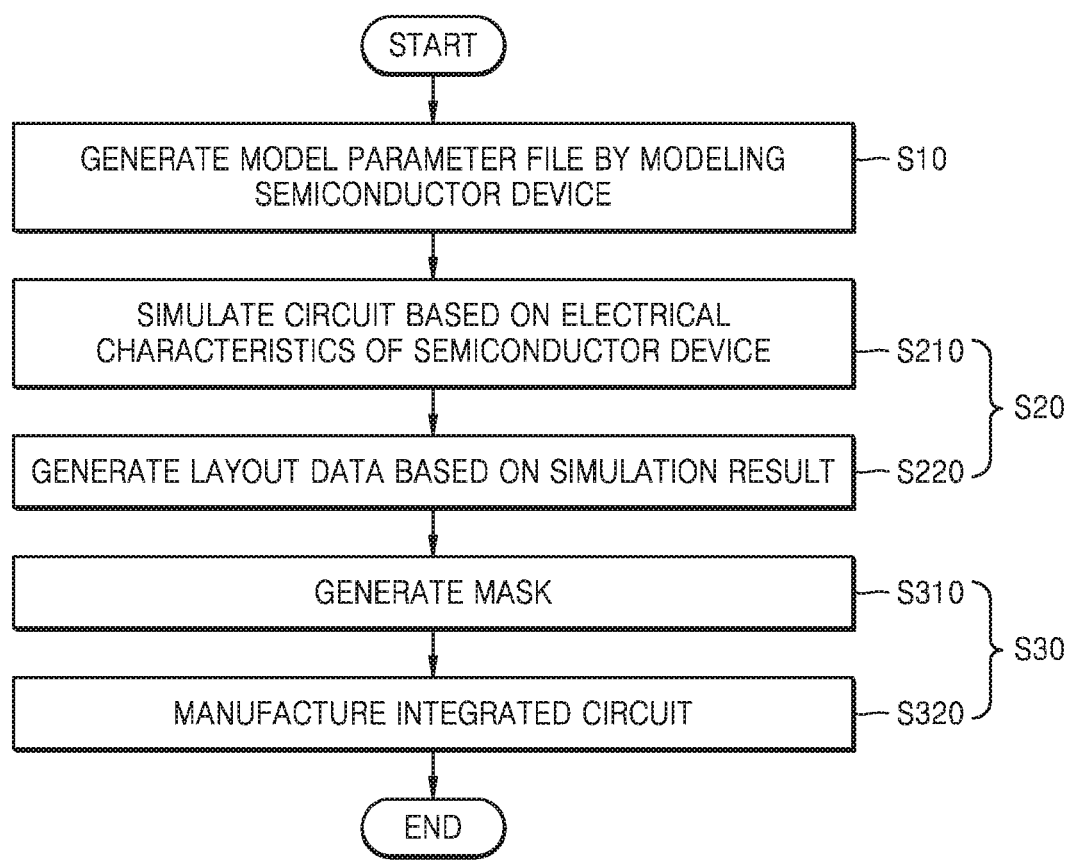
FIG. 1 is a flowchart illustrating a method of manufacturing an integrated circuit, according to at least one example embodiment.

FIG. 1 is a flowchart illustrating a method of manufacturing an integrated circuit, according to at least one example embodiment.

Referring to FIG. 1, the method of manufacturing an integrated circuit may include operations such as generating a model parameter file (S10), designing the integrated circuit (S20), and/or manufacturing the integrated circuit (S30), etc., but the example embodiments are not limited thereto. The designing of the integrated circuit (S20) includes a process of designing a layout of the integrated circuit and may be performed by a tool for designing the integrated circuit. For example, the tool for designing the integrated circuit may be a special purpose computer program including a plurality of special purpose computer readable instructions executed by at least one processor which transforms the at least one processor into at least one special purpose processor. Accordingly, the designing of the integrated circuit (S20) may be referred to as a computer-implemented method for designing the integrated circuit. The manufacturing of the integrated circuit (S30) includes a process of manufacturing the integrated circuit based on the designed layout and may be executed in a semiconductor processing module, but is not limited thereto. Hereinafter, each process included in the designing of the integrated circuit (S20) and the manufacturing of the integrated circuit (S30) will be described below.

In operation S10, a semiconductor device to be included in the integrated circuit may be modeled to generate a model parameter file. For example, model parameters representing a relation (and/or relationship) between at least one process variable of the semiconductor device and at least one electrical characteristic and/or physical characteristics of the semiconductor device are extracted to generate a model parameter file. Operation S10 will be described later with reference to FIG. 5.

In operation S20, electrical characteristics (e.g., electrical-magnetic field interference, parasitic capacitances, current leakages, poor electrical responses, incorrect electrical responses, etc.) and/or physical characteristics (e.g., optical interference, premature physical wear and tear, undesired breakages, thermal characteristics, etc.) of semiconductor devices included in the integrated circuit and a circuit to which the semiconductor devices are connected are simulated by using the model parameter file (S210), and semiconductor device layout data (e.g., transistor layout data, etc.) may be generated based on a result of the simulation (S220). For example, in generating of the layout data (S220), a synthesis operation and a place and routing (P&R) operation for placing and routing standard cells that define the integrated circuit may be performed, and the simulation result based on the model parameter file may be reflected in the synthesis operation and the P&R operation. In operation S210, the process of simulating the electrical characteristics and/or physical characteristics of the semiconductor devices included in the integrated circuit based on the model parameter file will be described later with reference to FIG. 4.

The "synthesis operation" is an operation of generating a netlist for the integrated circuit design by converting input data of the integrated circuit into a form of hardware including logic gates and may be referred to as logic synthesis. The input data may be an abstract form of a behavior of the integrated circuit, for example, data defined in a register transfer level (RTL), etc., but is not limited thereto. The netlist may be generated from the input data, e.g., the RTL code, by using a standard cell library, and/or may be a netlist of a gate level. In at least one example embodiment, the RTL code may be provided as an input file to a synthesis tool, and the netlist may be output from the synthesis tool as an output file. The netlist may include a plurality of standard cells (e.g., code for routinely used integrated circuit types, logic gates, logic circuits, IP cores, etc.) and information about connection relations among the standard cells.

The P&R operation may be an operation of performing P&R on the standard cells and/or special purpose cells (e.g., custom cells, one-time use logic circuitry, etc.) defining the integrated circuit and generating layout data about the integrated circuit. For example, the layout data may be data having a graphic design system (GDS) II format, but the example embodiments are not limited thereto.

In operation S310, at least one mask (e.g., a semiconductor layout mask for use in lithography processes for semiconductor fabrication, etc.) may be generated based on the layout data. First, an optical proximity correction (OPC) may be performed based on the layout data. Here, the OPC denotes a process of changing a layout by reflecting an error caused by an optical proximity effect. Next, the mask may be manufactured according to a changed layout according to a result of the OPC. Here, the mask may be manufactured by using the layout, in which the OPC is reflected, for example, the GDS II, etc., in which the OPC is reflected.

In operation S320, a semiconductor apparatus in which the integrated circuit is implemented may be manufactured by using the mask. Various semiconductor processes are performed on a semiconductor substrate such as a wafer by using a plurality of masks to form the semiconductor apparatus on which the integrated circuit is implemented. For example, the process using the mask may be a patterning process by using a lithography process, but the example embodiments are not limited thereto. Through the above patterning process, a desired pattern may be arranged on the semiconductor substrate and/or a material layer (e.g., a photoresist layer, an oxide layer, a metal layer, etc.). Here, the semiconductor processes may include a deposition process, an etching process, an ion process, a cleaning process, etc. In addition, the semiconductor processes may include a packaging process, in which the semiconductor device is mounted on, for example, a printed circuit board (PCB), etc., and sealed by a sealing material, and/or a test process, in which tests are performed on the semiconductor device or a semiconductor package.

Figure 2:
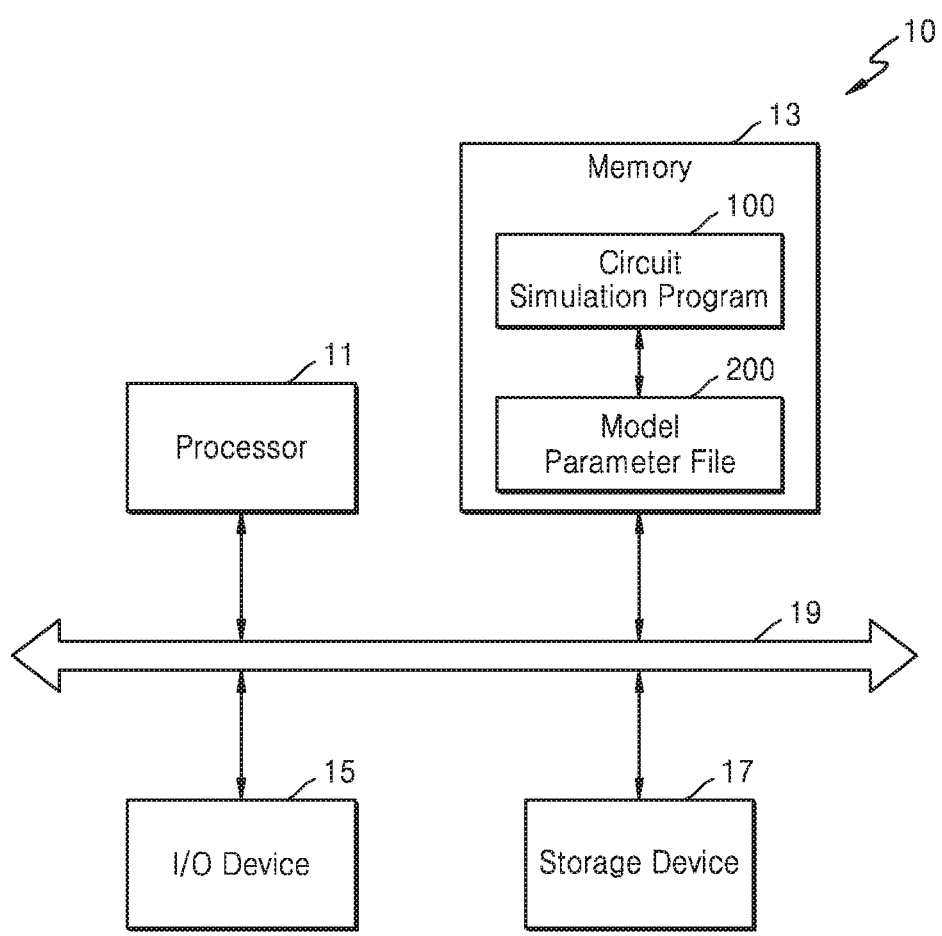
FIG. 2 is a block diagram of a computing system for designing an integrated circuit, according to at least one example embodiment.

FIG. 2 is a block diagram of a computing system 10 for designing an integrated circuit, according to at least one example embodiment.

Referring to FIG. 2, the computing system 10 for designing an integrated circuit (hereinafter, referred to as 'integrated circuit designing system 10') may include at least one processor 11, at least one memory 13, an input/output device 15, a storage device 17, and/or a bus 19, etc., but the example embodiments are not limited thereto. For example, the integrated circuit designing system 10 may execute operation S20 of FIG. 1, etc. In one or more example embodiments, the integrated circuit designing system 10 may be implemented as an integrated device (e.g., a device customized to perform the integrated circuit designing methods of at least one example embodiment, etc.), and accordingly, may be also referred to as an integrated circuit design apparatus. The integrated circuit designing system 10 may be provided as an apparatus exclusive for designing the integrated circuit of the semiconductor apparatus, but may be a computer for driving and/or executing various simulation tools and/or design tools. The integrated circuit designing system 10 may be a stationary computing system such as a desktop computer, a workstation, a server, a distributed computing system, a cloud computing system, etc., or a portable computing system such as a laptop computer, etc.

The at least one processor 11 (hereinafter referred to as the processor 11) may be configured to execute special purpose computer readable instructions for performing at least one of various operations for designing the integrated circuit. The processor 11 may communicate with the memory 13, the input/output device 15, and the storage device 17 via the bus 19. The processor 11 may execute application programs loaded on the memory 13, the application programs including computer readable instructions. For example, the processor 11 may execute a circuit simulation program 100 loaded on the memory 13, and the circuit simulation program 100 may extract electrical characteristics and/or physical characteristics of the semiconductor device and the circuit, in which the semiconductor device is included.

The memory 13 may store a program including a layout design for designing the integrated circuit and instructions for performing a simulation according to the designed layout. In at least one example embodiment, the circuit simulation program 100 for extracting the electrical characteristics and/or physical characteristics of the semiconductor device configuring the integrated circuit and the circuit in which the semiconductor device is included, and a model parameter file 200 may be loaded on the memory 13. For example, the electrical characteristics and/or physical characteristics of the semiconductor device may include a threshold voltage of a transistor, an on-current of the transistor, a current-voltage characteristic of the transistor, etc.

The memory 13 may further include various tools such as a simulation tool, etc. The memory 13 may be a volatile memory such as static random access memory (SRAM) and dynamic RAM (DRAM), or a non-volatile memory such as phase-change RAM (PRAM), magnetic RAM (MRAM), resistive RAM (ReRAM), ferroelectric RAM (FRAM), a flash memory, etc.

The input/output device 15 may control user input and output to/from user interface devices. For example, the input/output device 15 may include an input device such as a keyboard, a mouse, a touchpad, etc., to receive an input of integrated circuit design data. For example, the input/output device 15 may include an output device such as a display, a speaker, etc., to display the layout data and simulation results.

The storage device 17 may store a program such as the circuit simulation program 100, etc., and the model parameter file 200, and before the processor 11 executes the program, the program or at least a part of the program may be loaded from the storage device 17 to the memory 13. The storage device 17 may store data to be processed by the processor 11 or data processed by the processor 11. For example, the storage device 17 may store data to be processed by the circuit simulation program 100, e.g., the model parameter file 200 generated in operation S10 of FIG. 1, and characteristic data of the semiconductor device generated by the circuit simulation program 100. The circuit simulation program 100 may extract the electrical characteristics and/or physical characteristics of the semiconductor device included in the integrated circuit, based on information about the model parameter of the model parameter file 200 stored in the storage device 17.

The storage device 17 may include a non-volatile memory such as electrically erasable programmable read-only memory (EEPROM), a flash memory, PRAM, RRAM, MRAM, FRAM, etc., or a storage medium such as a memory card (multimedia card (MMC), eMMC, secure digital (SD), microSD, etc.), a solid state drive (SSD), a hard disk drive (HDD), magnetic tape, an optical disk, a magnetic disk, etc. Also, the storage device 17 may be detachably attached to the computing system 10 for designing the integrated circuit.

The bus 19 may be a system bus for providing a network in the computing system 10. The processor 11, the memory 13, the input/output device 15, and the storage device 17 may be electrically connected to one another and may exchange data with one another via the bus 19. However, the bus 19 is not limited to the above example and may further include relay units for efficient management.

Figure 3:
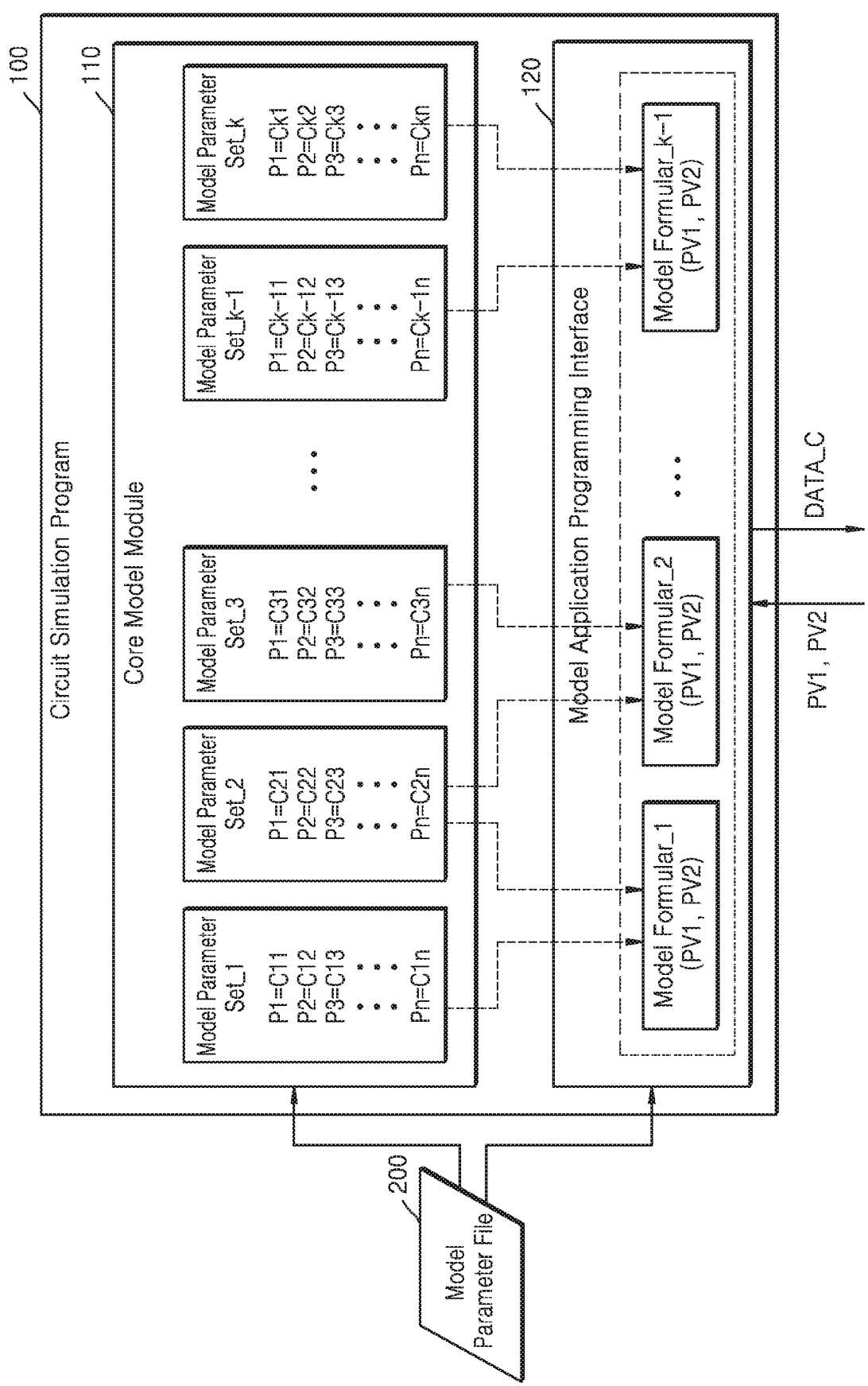
FIG. 3 is a diagram for describing a circuit simulation program stored in a computing system according to at least one example embodiment.

FIG. 3 is a diagram for describing the circuit simulation program 100 stored in the computing system 10 according to at least one example embodiment. As shown in FIG. 2, the memory 13 may store the circuit simulation program 100, and the circuit simulation program 100 may make the processor 11 extract the electrical characteristics and/or physical characteristics of the semiconductor device included in the integrated circuit. That is, the circuit simulation program 100 may include a plurality of instructions executable by the processor 11, and the plurality of instructions in the circuit simulation program 100 may make the processor 11 perform operations for extracting the electrical characteristics and/or physical characteristics of the semiconductor device. Here, the circuit simulation program 100 may extract the electrical characteristics and/or physical characteristics of the semiconductor device by using the model parameter file 200 generated in operation S10 of FIG. 1.

Referring to FIG. 3, the circuit simulation program 100 may include a plurality of procedures, that is, a core model module 110 and/or a model interface 120, etc., standardized according to a desired standard, such as an international standard, but not limited thereto. A procedure may denote a series of computer readable instructions for performing a certain task. The procedure may be referred to as a function, a routine, a subroutine, a subprogram, etc. Each of the procedures may process data provided from an external source (e.g., PV1, PV2, and the model parameter file 200) and/or data generated by another procedure. According to at least one example embodiment, that the processor 11 of FIG. 1 performs an operation by executing the procedure (e.g., 110 and/or 120, etc.) may be expressed as the procedure (e.g., 110 and/or 120, etc.) performing the above operation.

The core model module 110 may obtain a plurality of model parameter sets from the model parameter file 200. For example, the plurality of model parameter sets may include first to k-th model parameter sets, wherein k may be an integer of 5 or greater. However, the number of model parameter sets included in the core model module 110 according to at least one example embodiment may be less than 5.

The plurality of model parameter sets may correspond to at least one of the electrical characteristics and/or physical characteristics of the semiconductor device. For example, assuming that a plurality of model parameter sets for simulating a magnitude of a threshold voltage of a transistor are shown in FIG. 3, the core model module 110 may further include other model parameter sets than the plurality of model parameter sets shown in FIG. 3, with respect to other characteristics than the magnitude of the threshold voltage of the transistor. However, the example embodiments are not limited thereto, and other electrical characteristics and/or physical characteristics may be modeled, such as electrical response times, current leakage, interference, etc.

Each of the first to k-th model parameter sets may include a plurality of model parameters P1 to Pn corresponding to a value of a first process variable PV1 and a value of a second process variable PV2. Here, n may be an integer of 4 or greater, but the example embodiments are not limited thereto, and the number of model parameters P1 to Pn may vary depending on a desired and/or necessary range for simulating the electrical characteristics and/or physical characteristics of the semiconductor device derived according to a kind of the circuit model or the value of the first process variable PV1 and the value of the second process variable PV2.

The plurality of model parameters P1 to Pn included in each of the first to k-th model parameter sets may be expressed as constants. For example, the first model parameter set may include a plurality of first constants C11 to C1$n$, the second model parameter set may include a plurality of second constants C21 to C2$n$, and the k-th model parameter set may include a plurality of first constants Ck1 to Ckn. Here, when at least one of the value of the first process variable PV1 and the value of the second process variable PV2 changes, a corresponding model parameter set may also change, and values of the plurality of model parameters P1 to Pn corresponding to the value of the first process variable PV1 and the value of the second process variable PV2 may be changed.

The process variable may also denote physical/structural characteristics of the semiconductor device. For example, the process variable may include a length of a gate line, a width of an active area, a channel length, a device width, a doping profile, a thickness of an oxide layer, a dielectric constant of the oxide layer, a modulation index of the channel length, a temperature at which the semiconductor device is driven, etc., but the example embodiments are not limited thereto. Hereinafter, for convenience of description, it will be assumed that the first process variable is a length of a gate line of a transistor, and the second process variable is a width of an active area of the transistor, but the example embodiments are not limited thereto. When a value of at least one of the gate line length of the transistor and the active area width of the transistor varies, values of the plurality of model parameters P1 to Pn corresponding thereto may also vary.

In FIG. 3, the value of the model parameter varying depending on two process variables, that is, the first process variable and the second process variable, is described, but the example embodiments are not limited thereto, and the number of variables corresponding to each of the plurality of model parameters P1 to Pn may be changed according to the electrical characteristics and/or physical characteristics of the semiconductor device, which are desired to be obtained by calculating the value of the model parameter.

The applied model parameter set may vary depending on the value of the at least one process variable, e.g., the value of the first process variable PV1 and/or the value of the second process variable PV2. For example, when the value of the first process variable PV1 is a first value and the value of the second process variable PV2 is a first value, the plurality of first constants C11 to C1$n$ included in the first model parameter set may be selected as the plurality of model parameters P1 to Pn. Additionally, when the value of the first process variable PV1 is a second value and the value of the second process variable PV2 is a second value, the plurality of second constants C21 to C2$n$ included in the second model parameter set may be selected as the plurality of model parameters P1 to Pn. Additionally, when the value of the first process variable PV1 is a k-th value and the value of the second process variable PV2 is a k-th value, the plurality of k-th constants Ck1 to Ckn included in the k-th model parameter set may be selected as the plurality of model parameters P1 to Pn. However, the example embodiments are not limited to the above example.

The model interface 120 may be an application programming interface (API) that aids in describing an additional equation above each model parameter set. The model interface 120 is an interface for controlling functions provided by the circuit simulation program 100, for example, may include at least one interface and function (e.g., computer readable instructions) for controlling the model parameter file 200, controlling library, etc., and/or controlling data and an equation above an individual model parameter, etc. Here, the model interface 120 may determine model parameters corresponding to at least one received process variable and may output characteristic data DATA_C of the semiconductor device including information about predicted electrical characteristics and/or physical characteristics of the semiconductor device.

The model interface 120 may obtain a plurality of model formulae from the model parameter file 200 in order to determine the model parameters corresponding to the at least one received process variable and may receive the plurality of model parameter sets from the core model module 110. The plurality of model formulae may be expressions regarding and/or corresponding to the model parameters that vary depending on the value of the first process variable PV1 and the value of the second process variable PV2. The model interface 120 may determine the model parameters corresponding to the input value of the first process variable PV1 and the value of the second process variable PV2, based on the plurality of model formulae and the plurality of model parameter sets, and may output the characteristic data DATA_C of the semiconductor device.

The plurality of model formulae may include a first model formula connecting the first model parameter set to the second model parameter set, a second model formula connecting the second model parameter set to the third model parameter set, and a (k−1)-th model formula connecting the (k−1)-th model parameter set to the k-th model parameter set. For example, the first model formula may include a model formula connecting the first model parameter P1 of the first model parameter set to the first model parameter P1 of the second model parameter set, a model formula connecting the second model parameter P2 of the first model parameter set to the second model parameter P2 of the second model parameter set, and a model formula connecting the n-th model parameter Pn of the first model parameter set to the n-th model parameter Pn of the second model parameter set. However, the first model formula may include model formulae, the number of which is less than the number of model parameters included in one model parameter set, for example, less than n. The above description about the first model formula may be applied to the second to k-th model formulae.

The applied model formulae may vary depending on a range of the value of the first process variable PV1 (e.g., a plurality of desired values of the at least one process variable PV) and a range of the value of the second process variable PV2. For example, when the value of the first process variable PV1 that is equal to or greater than the first value and equal to or less than the second value and the value of the second process variable PV2 that is equal to or greater than the first value and equal to or less than the second value are received, the model interface 120 may determine model parameters corresponding to the value of the first process variable PV1 and the value of the second process variable PV2 based on the first model parameter set, the second model parameter set, and the first model formula. The model interface 120 may output the characteristic data DATA_C of the semiconductor device, which includes information about the predicted electrical characteristics and/or physical characteristics of the semiconductor device corresponding to the value of the first process variable PV1 and the value of the second process variable PV2, based on the determined model parameters.

Additionally, when the value of the first process variable PV1 that is equal to or greater than a second value and equal to or less than a third value and the value of the second process variable PV2 that is equal to or greater than the second value and equal to or less than the third value are received, the model interface 120 may determine model parameters corresponding to the value of the first process variable PV1 and the value of the second process variable PV2 based on the second model parameter set, the third model parameter set, and the second model formula. The model interface 120 may output the characteristic data DATA_C of the semiconductor device, which includes information about the predicted electrical characteristics and/or physical characteristics of the semiconductor device corresponding to the value of the first process variable PV1 and the value of the second process variable PV2, based on the determined model parameters.

Additionally, when the value of the first process variable PV1 that is equal to or greater than a (k−1)-th value and equal to or less than a k-th value and the value of the second process variable PV2 that is equal to or greater than the (k−1)-th value and equal to or less than the k-th value are received, the model interface 120 may determine model parameters corresponding to the value of the first process variable PV1 and the value of the second process variable PV2 based on the (k−1)-th model parameter set, the k-th model parameter set, and the (k−1)-th model formula. The model interface 120 may output the characteristic data DATA_C of the semiconductor device, which includes information about the predicted electrical characteristics and/or physical characteristics of the semiconductor device corresponding to the value of the first process variable PV1 and the value of the second process variable PV2, based on the determined model parameters.

However, the example embodiments are not limited to the above example. In at least one example embodiment, ranges of the value of the first process variable PV1 and the ranges of the value of the second process variable PV2 applied to different model formulae may be successive with each other.

Figure 4:
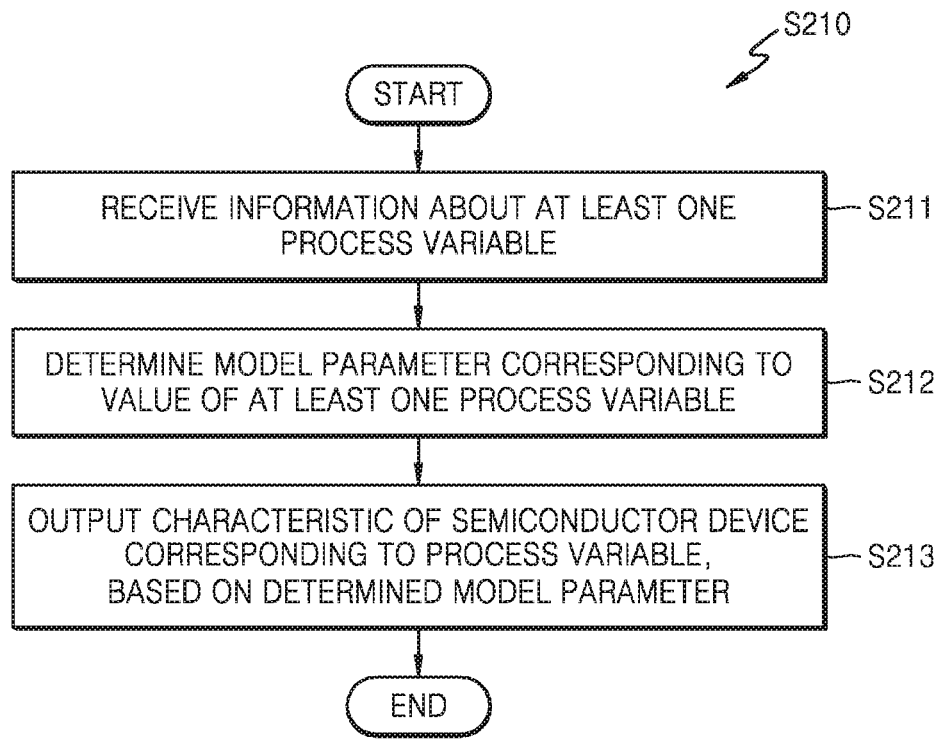
FIG. 4 is a flowchart illustrating a method of manufacturing an integrated circuit, according to at least one example embodiment.

FIG. 4 is a flowchart illustrating a method of manufacturing an integrated circuit, according to at least one example embodiment, and for describing operation S210 of FIG. 1. In operation S20, a process of performing circuit simulation of the electrical characteristics and/or physical characteristics of the semiconductor devices included in the integrated circuit based on the model parameter file 200 will be described below.

Referring to FIGS. 3 and 4, in operation S211, the model interface 120 may receive information about at least one process variable. For example, the model interface 120 may include information about the value of the first process variable PV1 and the value of the second process variable PV2. In FIG. 3, the model interface 120 receives information about the values of the two process variables, but the number of process variables may vary depending on characteristics of the semiconductor device.

In operation S212, the model interface 120 may determine model parameters corresponding to the value of at least one process variable. For example, the model interface 120 may select a model formula corresponding to the at least one process variable to be applied and/or a model parameter set corresponding to the at least one process variable to be applied, based on a range of the value of the first process variable PV1 and/or a range of the value of the second process variable PV2. By using the selected model formula and the model parameter set, the model parameters corresponding to the value of the first process variable PV1 and the value of the second process variable PV2 may be determined. For example, the second model formula may be selected, and the first to n-th model parameters P1 to Pn may be determined based on the second model parameter set, the third model parameter set, and the second model formula, etc., but the example embodiments are not limited thereto.

In operation S213, the model interface 120 may predict the electrical characteristics and/or physical characteristics of the semiconductor device corresponding to the received value of the first process variable PV1 and the value of the second process variable PV2 based on the determined model parameters and may output the characteristic data DATA_C.

The computing system 10 according to at least one example embodiment may be provided to independently extract individual point model parameters satisfying individual characteristics of at least one process variable (e.g., the first process variable PV1 and the second process variable PV2) and/or characteristics of a certain area (e.g., a desired area of the semiconductor, a desired component of the integrated circuit, a desired logic cell, a desired logic gate, a desired transistor, etc.), and after that, to output characteristic data (DATA_C) about the electrical characteristics and/or physical characteristics that is variable while having continuity according to the at least one process variable via the plurality of model formulae 121 described in the model interface 120. Therefore, the computing system 10 storing the circuit simulation program 100 does not need to depend upon an accuracy level of a core model module that is provided in advance in order to simulate the variation in characteristics according to the variation in various process variables (e.g., the channel length, the channel area, temperature, etc.), and thus, may accurately predict the individual electrical characteristics and/or physical characteristics of the semiconductor device and may ensure continuous electrical characteristic values with respect to at least one process variable.

Figure 5:
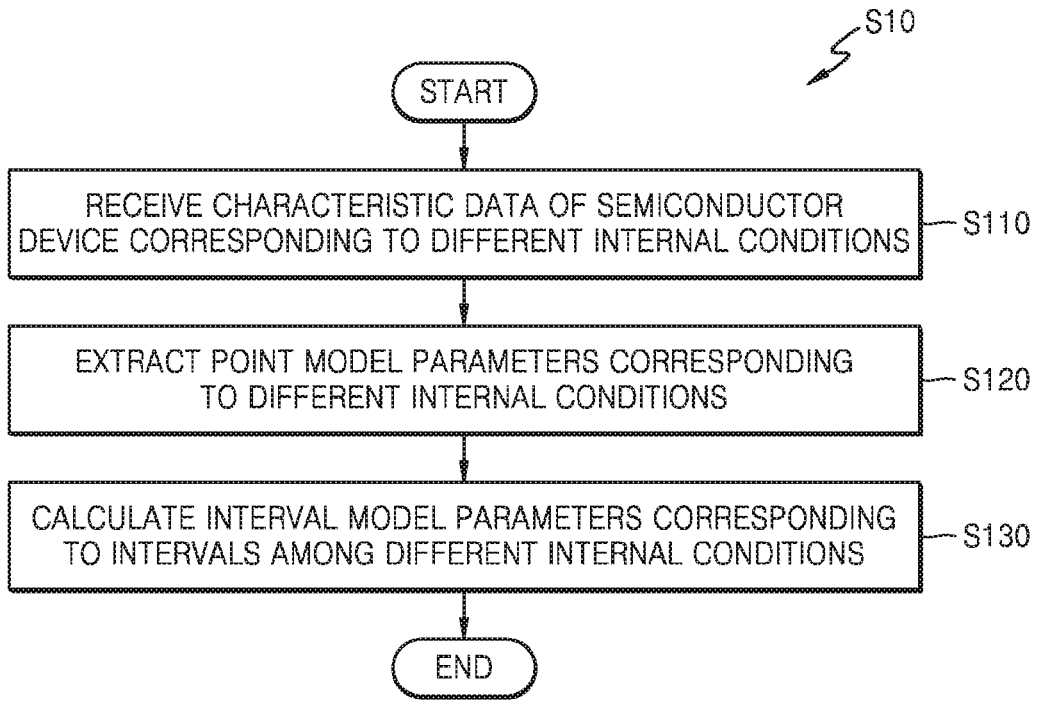
FIG. 5 is a flowchart illustrating a method of manufacturing an integrated circuit, according to at least one example embodiment.

FIG. 5 is a flowchart illustrating a method of manufacturing an integrated circuit, according to at least one example embodiment, and for describing operation S10 of FIG. 1.

Referring to FIG. 5, operation S10 may include operation S110, operation S120, and/or operation S130, but is not limited thereto. Each of the processes included in operation S10 may be performed in a separate computing system different from the computing system performing operation S20 of FIG. 1, for example, a computing system for extracting the model parameters and simulating circuit characteristics, but is not limited thereto. Operation S10 and operation S20 may be performed by the same computing system, etc.

In operation S110, electrical characteristic data and/or physical characteristic data of the semiconductor device corresponding to different internal conditions may be received. The internal conditions of the semiconductor device may denote conditions about physical/structural characteristics of the semiconductor device. For example, when two semiconductor devices have different values from each other in at least one of the process variables, such as a length of a gate line, a width of an active area, a channel length, a device width, a doping profile, a thickness of an oxide layer, a dielectric constant of the oxide layer, a modulation index of the channel length, etc., it may be regarded that the two semiconductor devices have different internal conditions. The electrical characteristic data of the semiconductor device may be obtained by manufacturing a sample semiconductor device having a certain internal condition and by measuring electrical characteristics and/or physical characteristics of the sample semiconductor device.

In operation S120, based on the different internal conditions and the electrical characteristic values and/or physical characteristic values corresponding respectively to the different internal conditions, point model parameters corresponding respectively to the different internal conditions may be extracted. Here, the point model parameters may be constants having certain values, and the constants may satisfy the corresponding internal conditions, but are not limited thereto.

The internal conditions of the semiconductor device and the electrical characteristic values and/or physical characteristic values corresponding to the internal conditions may be connected to each other via selecting various core model modules developed according to a desired standard, such as an international standard, etc., and extracting the model parameters. However, an accuracy of simulating the variation in the electrical characteristics and/or physical characteristics according to the internal conditions of the semiconductor device may be affected by an accuracy of the selected circuit model formula. Therefore, when the semiconductor device has a certain electrical characteristic and/or physical characteristic (e.g., a certain magnitude of the threshold voltage, a certain operating temperature, etc.) under a certain internal condition (e.g., a length of a certain gate line and a width of a certain active area, etc.), model parameters independently satisfying the certain electrical characteristic value and/or physical characteristic value with respect to the certain internal condition are extracted and the accuracy of the model parameters under the certain internal condition may be ensured regardless of the accuracy of the model formula.

Also, various operations of extracting different model parameters respectively corresponding to different internal conditions may be performed in parallel, and thus, even when the number of semiconductor devices having different internal conditions increases because the number of sample semiconductor devices increases in operation S120, a time taken to perform operation S120 may not greatly increase, however the example embodiments are not limited thereto.

In operation S130, interval model parameters corresponding to various intervals among different internal conditions may be calculated. In detail, based on the point model parameters extracted in operation S120, the interval model parameters corresponding to the intervals among the different internal conditions may be calculated. The interval model parameters may be calculated in the form of functions regarding the process variables, unlike the point model parameters.

Since there is a limitation in increasing the number of sample semiconductor devices and characteristic data actually corresponding to a region between the internal conditions of each sample semiconductor device may not be obtained, the interval model parameters may be extracted based on the point model parameter and an arbitrary regression equation. Here, the arbitrary regression equation may be stored in the computing system for extracting the model parameters.

The point model parameters and the interval model parameters may be stored in the model parameter file 200, and the core model module 110 of FIG. 3 may obtain the point model parameters from the model parameter file 200 as the model parameter set, and the model interface 120 may obtain the interval model parameters from the model parameter file 200 as the model formulae.

According to the method of manufacturing the integrated circuit of at least one example embodiment, the point model parameters corresponding respectively to different internal conditions are extracted, for example in parallel, or sequentially, and then, the interval model parameters are calculated from the regions among the different internal conditions. Thus, a time taken to extract the model parameters and generate the model parameter file may be reduced, and the accuracy in the simulation operation using the model parameters may be improved.

Figure 6:
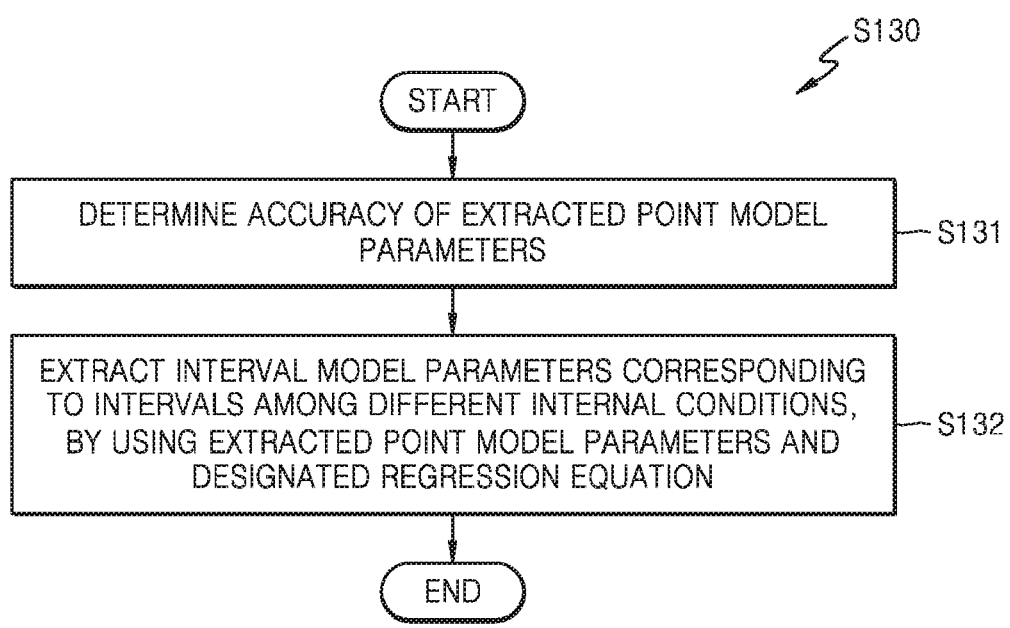
FIG. 6 is a flowchart illustrating a method of manufacturing an integrated circuit, according to at least one example embodiment.

FIG. 6 is a flowchart illustrating a method of manufacturing an integrated circuit, according to at least one example embodiment, and for describing operation S130 of FIG. 5.

Referring to FIGS. 5 and 6, in operation S130, operation S131 and operation S132 may be sequentially performed, but are not limited thereto. In operation S131, accuracy of the point model parameters extracted in operation S120 may be determined.

For example, it may be identified whether a target characteristic value (e.g., desired electrical and/or physical characteristic value, etc.) of the semiconductor device, corresponding to the internal condition of the semiconductor device, may be derived, based on the extracted point model parameters and the internal conditions of the semiconductor device. When the target characteristic value of the semiconductor device is derived, it may be determined that the point model parameters are accurately extracted.

When the accuracy of the point model parameters is determined in operation S131, the interval model parameters corresponding to the intervals among the different internal conditions may be calculated from the extracted point model parameters by using an arbitrary regression equation. In at least one example embodiment, the different internal conditions may denote internal conditions that are adjacent to one another, but the example embodiments are not limited thereto. For example, in the interval between a first internal condition and a second internal condition that are adjacent to each other, it may denote that the electrical characteristic data and/or physical characteristic data of the semiconductor device corresponding to the internal condition in the interval is not received in operation S110.

The regression equation is an arbitrary equation capable of inducing an improved and/or optimal equation suitable for distribution state of points, in a case where the points are distributed according to a certain rule. The regression equation may be stored in advance in the computing system for extracting the model parameter. A user may select an arbitrary regression equation considering a relationship between the process variable and the characteristics of the semiconductor device, and the computing system for extracting the interval model parameter may perform operation S132 based on the selected regression equation.

In at least one example embodiment, in operation S132, the interval model parameters corresponding to the interval between different internal conditions may be calculated by using the extracted point model parameters and the arbitrary regression equation. For example, an arbitrary regression equation corresponding to the interval between two adjacent internal conditions that are different from each other is defined, and the interval model parameters connecting two electrical characteristics and/or physical characteristics corresponding respectively to the two different internal conditions may be calculated by using the regression equation. Based on the point model parameters extracted in operation S120, the regression equation for outputting the characteristics between the different internal conditions in the form of interpolation while passing through values of the electrical characteristics and/or physical characteristics corresponding to the different internal conditions may be derived. The internal model parameters derived from the regression equation may be obtained as model formulae in the model interface 120 of FIG. 3. Each process in FIGS. 5 and 6 will be described in detail with reference to FIG. 7 below.

Figure 7:
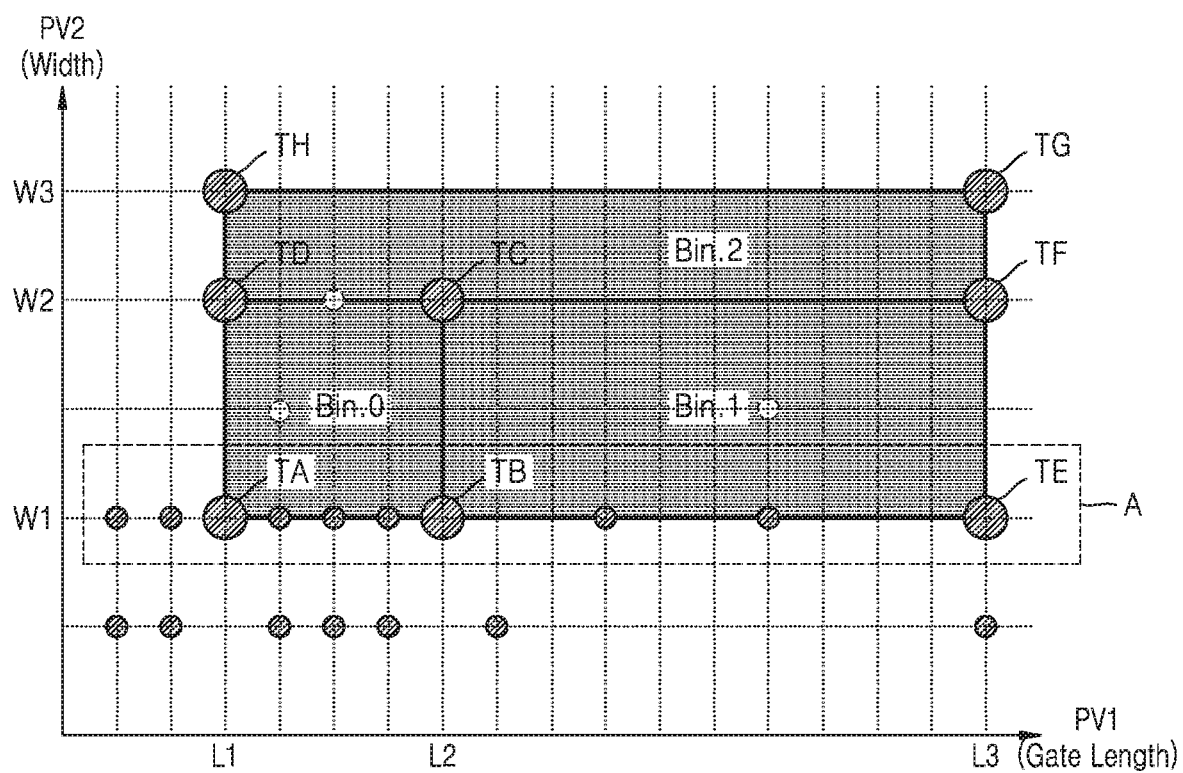
FIG. 7 is a diagram for describing internal conditions in a semiconductor device included in an integrated circuit at least one example embodiment.
Figure 8:
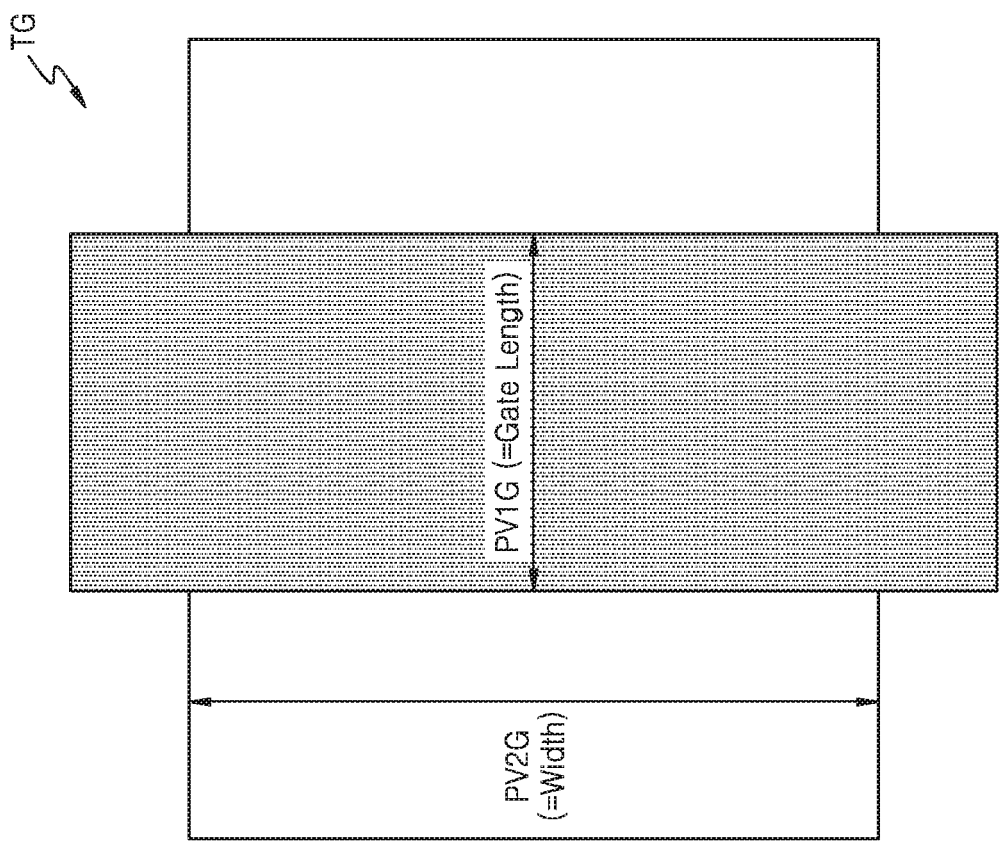
FIG. 8 is a diagram for describing internal conditions in a first semiconductor device and an eighth semiconductor device of FIG. 7 at least one example embodiment.
Figure 8:
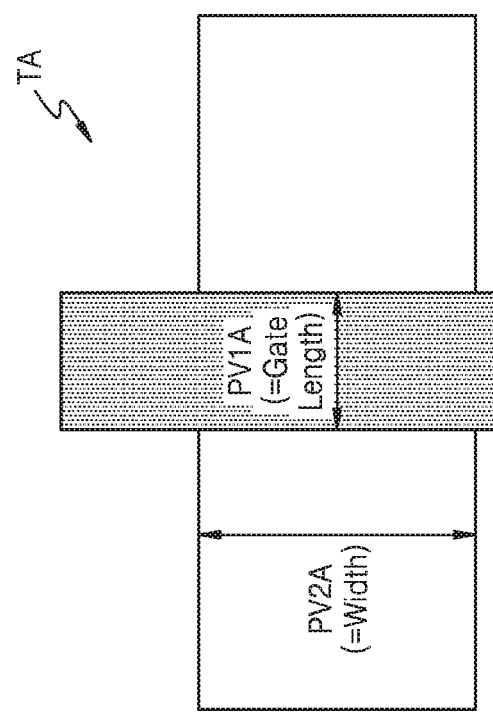

FIG. 7 is a diagram for describing the internal conditions in the semiconductor device included in the integrated circuit according to at least one example embodiment. FIG. 8 is a diagram for describing internal conditions in a first semiconductor device and an eighth semiconductor device of FIG. 7 according to at least one example embodiment. FIGS. 9A to 9C are diagrams for describing a process of extracting the point model parameters and a process of extracting the interval model parameters of FIG. 5 according to at least one example embodiment. In FIGS. 9A to 9C, extraction of the model parameters based on the internal conditions of first to eighth semiconductor devices of FIG. 7 will be described.

Referring to FIGS. 7 and 8, in operation S110 of FIG. 5, the electrical characteristic data and/or physical characteristic data of the semiconductor device corresponding to each of the internal conditions of a plurality of semiconductor devices may be received, and FIG. 7 shows internal conditions in each of the semiconductor devices. FIG. 7 may illustrate a scattering of the semiconductor devices each having a length of a gate line as a first process variable PV1 and a width of an active area as a second process variable PV2, that is, two process variables PV1 and PV2, at least one of which is different from the other. For example, the internal condition of a first semiconductor device TA may include a gate line length PV1A of L1 and an active area width PV2A of W1. On the other hand, the internal condition of an eighth semiconductor device TG may include a gate line length PV1G of L3 and an active area width PV2G of W3.

Referring to FIGS. 7 and 9A, based on internal conditions of first to eighth semiconductor devices TA to TG and the characteristic data (e.g., electric characteristic data and/or physical characteristic data, etc.) of the semiconductor device corresponding to each of the internal conditions, point model parameters corresponding to each of the internal conditions may be extracted (S120 of FIG. 5). The point model parameters corresponding to internal conditions L1 and W1 of the first semiconductor device TA may configure one first set (Aset), and point model parameters corresponding to internal conditions L2 and W1 of the second semiconductor device TB may configure one second set Bset. In addition, point model parameters corresponding to internal conditions of each of the third to eighth semiconductor devices TC to TG may configure third to eighth sets Cset to Gset. Here, the point model parameters included in the first to eighth sets Aset to Gset may be constants having certain values.

The point model parameters included in the first to eighth sets Aset to Gset may be extracted in parallel in units of sets. For example, the point model parameters included in the first set Aset and the point model parameters included in the second set Bset may be extracted in parallel with each other. The above description may be also applied to the point model parameters included in the third to eighth sets Cset to Gset. The first to eighth sets Aset to Gset of FIG. 9A may correspond to the model parameter sets of the core model module 110 of FIG. 3.

Referring to FIGS. 7 and 9B, interval model parameters corresponding to intervals Bin.0, Bin.1, and Bin.2, etc., among different internal conditions of the first to eighth semiconductor devices TA to TG may be extracted (S130 of FIG. 5). The interval model parameters may be described as model formulae in the model interface in the form of an expression.

For example, an interval in which a length of a gate line as the first process variable PV1 has a value equal to or greater than L1 and equal to or less than L2 and a width of the active area as the second process variable PV2 has a value equal to or greater than W1 and equal to or less than W2 is defined as a first interval Bin.0, an interval in which the length of the gate line (PV1) has a value equal to or greater than L2 and equal to or less than L3 and the width of the active area (PV2) has a value equal to or greater than W1 and equal to or less than W2 is defined as a second interval Bin.1, and an interval in which the length of the gate line (PV1) has a value equal to or greater than L1 and equal to or less than L3 and the width of the active area (PV2) has a value equal to or greater than W2 and equal to or less than W3 is defined as a third interval Bin.2. However, the example embodiments are not limited thereto.

By using the extracted point model parameters, e.g., the point model parameters included in the first to eighth sets Aset to Gset of FIG. 9A, interval model parameters Bin.0<P1>, Bin.1<P1>, and Bin.2<P1> corresponding to the intervals among the different internal conditions may be extracted via a model parameter extraction equation. For example, the interval model parameters corresponding to the first interval Bin.0 may be extracted by using the plurality of point model parameters included in the first to fourth sets Aset to Dset of FIG. 9A. The interval model parameters corresponding to the second interval Bin.1 may be extracted by using the plurality of point model parameters included in the second, third, fifth, and sixth sets Bset, Cset, Eset, and Fset of FIG. 9A. The interval model parameters corresponding to the third interval Bin.2 may be extracted by using the plurality of point model parameters included in the fourth, sixth, seventh, and eighth sets Dset, Fset, Gset, and Hset of FIG. 9A. Therefore, the defined first to third intervals Bin.0 to Bin.2 may respectively correspond to different interval model parameters.

A desired regression equation (and/or an arbitrary regression equation) connecting the point model parameters may be expressed as a function of process variables so that the interval model parameter may vary depending on the change in the internal conditions. For example, in the desired regression equation shown in FIG. 9B, an interval model parameter G may be configured to have a value varying depending on the length of the gate line (PV1) and the width of the active area (PV2), which are the process variables. Also, the interval model parameters may have values equal to those of the point model parameters in a boundary condition, and accordingly, the characteristics of the intervals may have successive output values.

Referring to FIGS. 7 and 9C, a final model parameter file may be provided as a plurality of model sets Bin.0 set, Bin.1 set, and Bin.2 set including the regression equation. For example, the regression equation and the plurality of interval model parameters included in each of the plurality of model sets Bin.0 set, Bin.1 set, and Bin.2 set may be expressed as a function of the length of the gate line (PV1) and the width of the active area (PV2). Therefore, when at least one of the length of the gate line (PV1) and the width of the active area (PV2) changes, values of the plurality of model parameters that are finally extracted may change.

For example, the applied model set may vary depending on a range of the length of the gate line (PV1) and a range of the width of the active area (PV2). Additionally, in the first interval Bin.0, the model parameters included in the first model set Bin.0set may be applied, in the second interval Bin.1, the model parameters included in the second model set Bin.1set may be applied, and in the third interval Bin.2, the model parameters included in the third model set Bin.2set may be applied. The plurality of model sets Bin.0set, Bin.1 set, and Bin.2set may respectively correspond to the model formulae that are different from one another as shown in FIG. 3. For example, the first model set Bin.0set may correspond to the first model formula, the second model set Bin.1 set may correspond to the second model formula, and the third model set Bin.2set may correspond to the third model formula.

Figure 10:
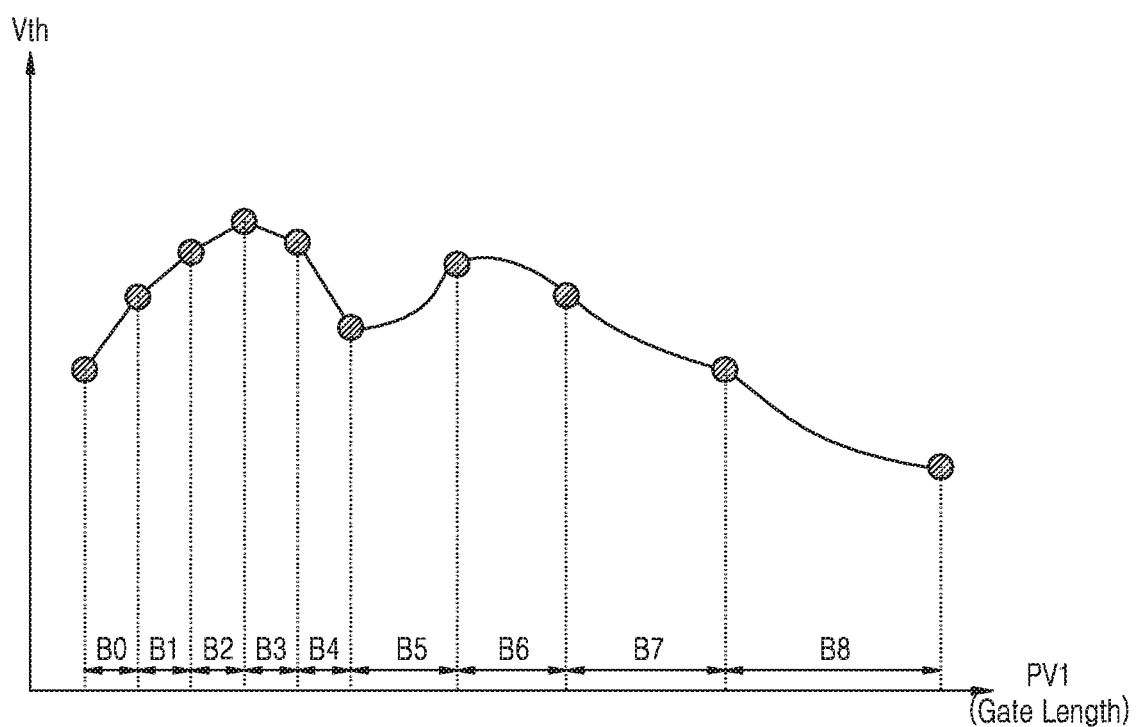
FIG. 10 is a graph for describing a variation in an electrical characteristic of a semiconductor device according to change in internal conditions of the semiconductor device at least one example embodiment.

FIG. 10 is a graph for describing a variation in an electrical characteristic of a semiconductor device according to change in internal conditions of the semiconductor device according to at least one example embodiment. The graph of FIG. 10 illustrates a variation in electrical characteristics and/or physical characteristics according to internal conditions included in a region A of FIG. 7.

Referring to FIG. 10, each point in the graph may be obtained by directly measuring a variation in an electrical characteristic and/or a physical characteristic (e.g., a threshold voltage of a transistor, an operating temperature of the transistor, a patristic capacitance value of a transistor, etc.) of the semiconductor device according to a value of the first process variable PV1 (e.g., the length of the gate line). On the other hand, in each of first to ninth intervals B0 to B8 among the points of the graph, a curve connecting the points shows a characteristic value of the semiconductor device according to the value of the first process variable PV1, wherein the characteristic value is predicted by performing operations S110, S120, and S130 of FIG. 5, that is, the extracted interval model parameters are provided as the model formulae in the model interface (120 of FIG. 2) above the core model module (110 of FIG. 2).

According to the method of manufacturing the integrated circuit, even when there is no actual measurement data, the characteristics of the semiconductor device in the first to ninth intervals B0 to B8 may be simulated by using the interval model parameters extracted by using the regression equation. In addition, since the interval model parameters corresponding to the intervals among the different internal conditions are extracted by a desired and/or arbitrary regression equation based on the point model parameters respectively corresponding to the different internal conditions, the accuracy in predicting the electrical characteristics and/or physical characteristics of the semiconductor device having the internal conditions in the intervals among the different internal conditions may be improved and the characteristics of the semiconductor device may be simulated throughout all of the intervals of the internal conditions.

Figure 11A:
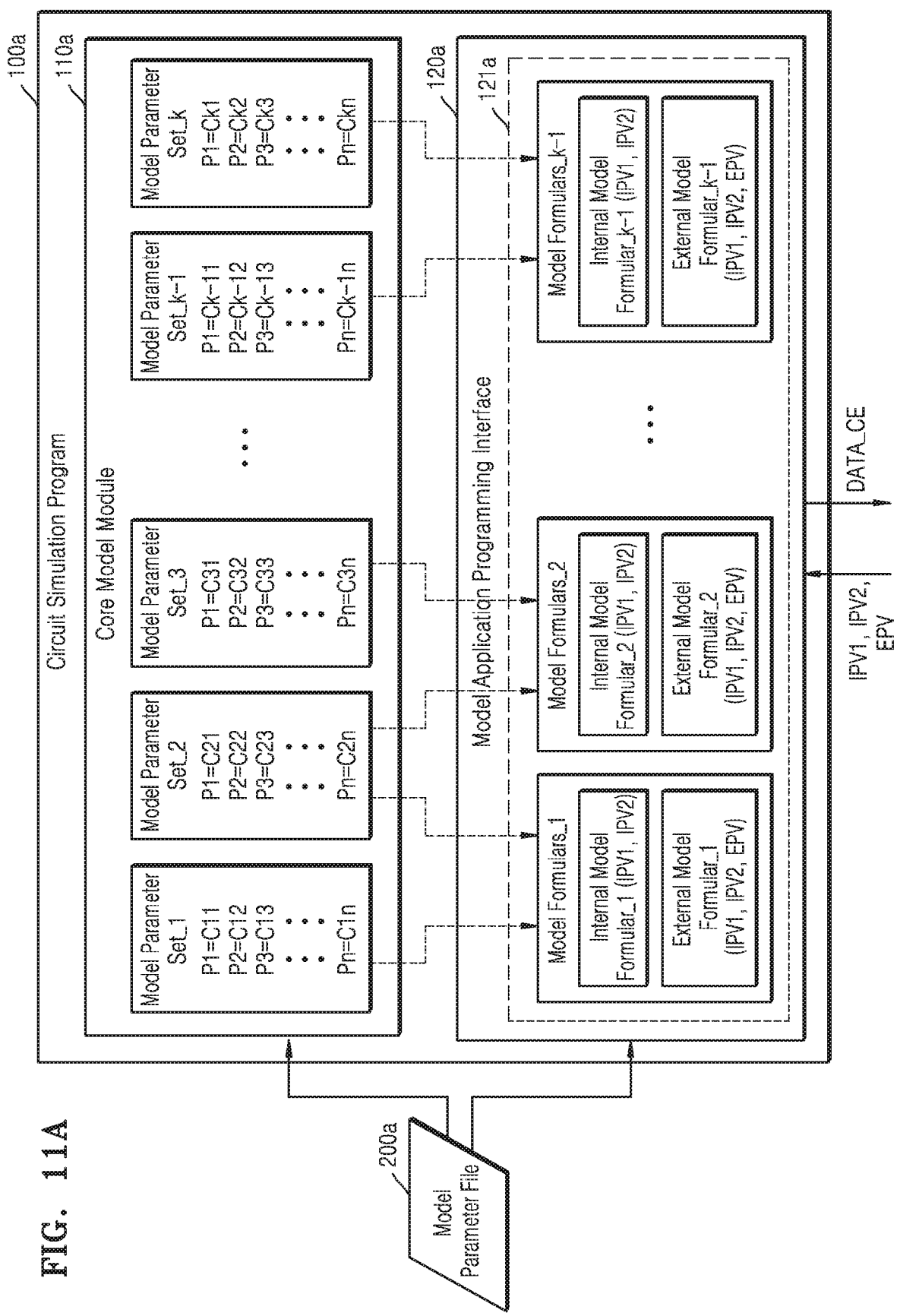
FIG. 11A is a diagram for describing a circuit simulation program stored in a computing system according to at least one example embodiment.
Figure 11B:
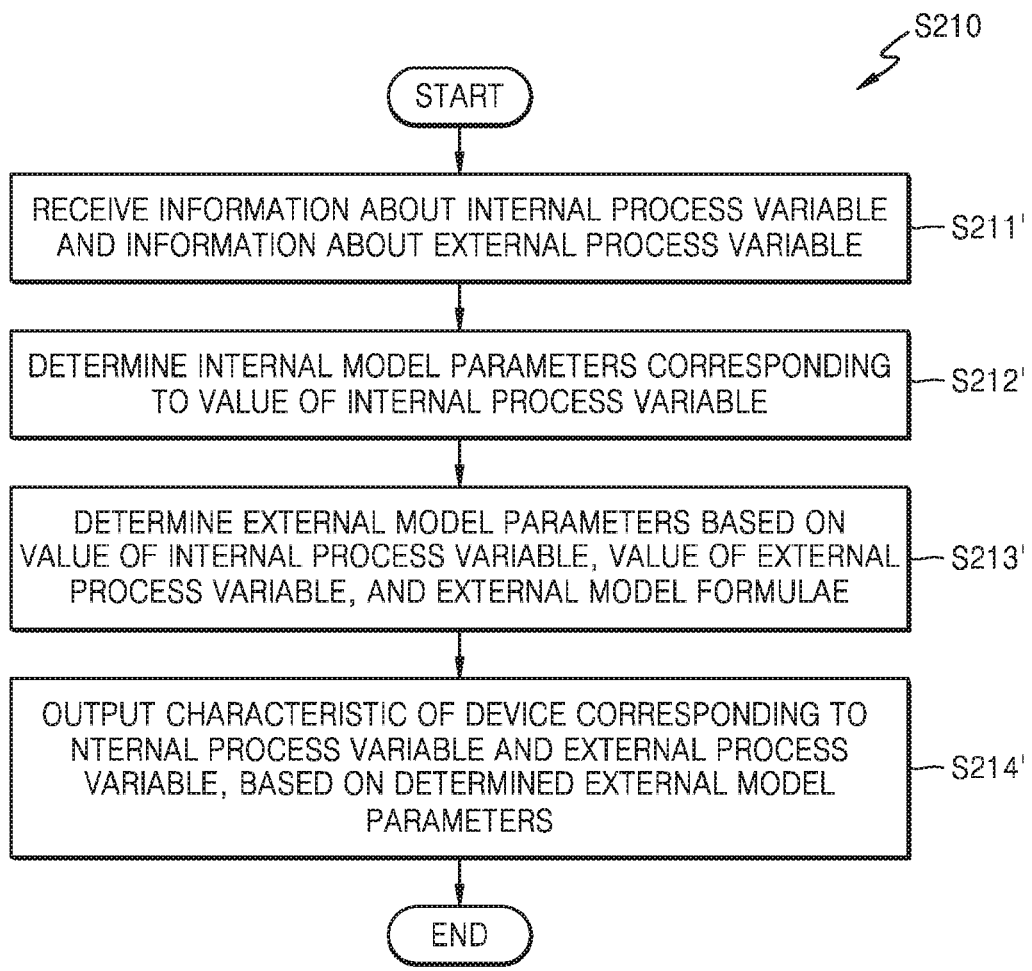
FIG. 11B is a flowchart illustrating a method of manufacturing an integrated circuit, according to at least one example embodiment.

FIG. 11A is a diagram for describing a circuit simulation program stored in a computing system according to at least one example embodiment. FIG. 11B is a flowchart illustrating a method of manufacturing an integrated circuit, according to at least one example embodiment, and for describing operation S210 of FIG. 1. In FIG. 11A, descriptions about the same elements as those of FIG. 3 will be omitted.

Referring to FIG. 11A, a core model module 110a may obtain a plurality of model parameter sets from a model parameter file 200a. For example, a plurality of internal model parameter sets may include first to k-th internal model parameter sets, wherein k may be an integer equal to or greater than 5. However, the number of model parameter sets included in the core model module 110 according to at least one example embodiment may be less than 5. The plurality of model parameters P1 to Pn included in each of the first to k-th model parameter sets may be expressed as constants, but is not limited thereto.

An internal process variable may denote physical/structural characteristics of the semiconductor device, but is not limited thereto. On the other hand, an external process variable may denote physical/structural characteristics that may be generated due to a peripheral environment around the semiconductor device, not the physical/structural characteristics of the semiconductor device itself. For example, it may denote physical/structural characteristics that may be generated from a relationship between a semiconductor device and another semiconductor device adjacent thereto.

Therefore, the external process variable may include a parasitic external factor that causes a variation in the electrical characteristics and/or physical characteristics due to, for example, a local layout effect (LLE), a statistical effect, etc. that are generated due to the semiconductor device arranged in periphery. For example, the external process variable may include a distance of an active area, that is, a distance from the gate line to an insulating layer that is used for electrically insulating from another adjacent semiconductor device, but is not limited thereto.

The model interface 120a may be an API that aids in describing an additional equation above each model parameter set. The model interface 120a may obtain a plurality of model formulae 121a from the model parameter file 200a, in order to determine model parameters corresponding to a value of a first internal process variable IPV1, a value of a second internal process variable IPV2, and a value of an external process variable EPV. The plurality of model formulae 121a may include first to (k−1)-th internal model formulae and first to (k−1)-th external model formulae.

The model interface 120a may obtain the first to (k−1)-th internal model formulae from the model parameter file 200a in order to determine the internal model parameters and may receive a plurality of model parameter sets from the core model module 110a. The first to (k−1)-th internal model formulae may be formulae about the internal model parameters that vary depending on the value of the first internal process variable IPV1 and the value of the second internal process variable IPV2. The model interface 120a may determine the model parameters corresponding to the input value of the first internal process variable IPV1 and the value of the second internal process variable IPV2, based on the first to (k−1)-th internal model formulae and the plurality of model parameter sets.

The model interface 120a may obtain first to (k−1)-th external model formulae from the model parameter file 200a, in order to determine external model parameters. In at least one example embodiment, the first to (k−1)-th external model formulae may be relations between (e.g., correspond to, have a relationship with, etc.) the external model parameter and the internal model parameter for converting the internal model parameters to the external model parameters and may be expressed as functions about the internal process variable and the external process variable. Therefore, when the internal model parameters only reflect the value of the internal process variable, the external model parameters may be user random model parameters reflecting both the value of the internal process variable and the value of the external process variable, but the example embodiments are not limited thereto.

The applied external model formulae may vary depending on, for example, a range of the value of the first internal process variable IPV1 and/or a range of the value of the second internal process variable IPV2, but the example embodiments are not limited thereto. For example, first external model formulae may be applied in a range of the value of the first internal process variable IPV1 and/or a range of the value of the second internal process variable IPV2, in which first internal model formulae are applied, second external model formulae may be applied in a range of the value of the first internal process variable IPV1 and/or a range of the value of the second internal process variable IPV2, in which second internal model formulae are applied, and (k−1)-th external model formulae may be applied in a range of the value of the first internal process variable IPV1 and/or a range of the value of the second internal process variable IPV2, in which (k−1)-th internal model formulae are applied, etc.

The model interface 120a may convert the internal model parameters to the external model parameters based on the first to (k−1)-th external model formulae. The model interface 120a may output characteristic data DATA_CE of the semiconductor device, to which the variation in the electrical characteristics and/or physical characteristics caused by the parasitic external factor is reflected based on the external model parameters.

Referring to FIGS. 11A and 11B, the model interface 120a may receive information about the process variable in operation S211'. For example, the model interface 120a may receive information about the value of the first internal process variable IPV1, the value of the second internal process variable IPV2, and a value of an external process variable EPV.

In operation S212', the model interface 120a may determine internal model parameters corresponding to the value of at least one process variable. For example, the model interface 120a may select the internal model formulae and model parameter sets to be applied, based on the range of the value of the first internal process variable IPV1 and/or the range of the value of the second internal process variable IPV2, and may determine the internal model parameters corresponding to the value of the first internal process variable IPV1 and/or the value of the second internal process variable IPV2 by using the selected internal model formulae and the model parameter sets, etc. For example, the second internal model formulae may be selected, and the internal model parameters may be determined, based on the second internal model formulae, but the example embodiments are not limited thereto.

In operation S213', the model interface 120a may determine external model parameters based on the value of the internal process variable (e.g., IPV1, IPV2), the value of the external process variable EPV, and/or external model formulae, etc.

In operation S214', the model interface 120a may output characteristic data DATA_CE including predicted electrical characteristics and/or physical characteristics of the semiconductor device based on the value of the first internal process variable IPV1, the value of the second internal process variable IPV2, the value of the external process variable EPV, and/or the determined external model parameters, etc.

According to the computing system of at least one example embodiment, the plurality of model parameters corresponding to the electrical characteristics and/or physical characteristics of the semiconductor device do not have constant values, but values that vary depending on the process variable. Therefore, the computing system may accurately predict the electrical characteristics and/or physical characteristics of the semiconductor device according to the variation in the value of the process variable.

Also, the computing system according to at least one example embodiment predicts the electrical characteristics and/or physical characteristics of the semiconductor device by reflecting not only the physical/structural characteristics of the semiconductor device, but also reflecting the relationship with an adjacent semiconductor device, and thus, the electrical characteristics and/or physical characteristics of the semiconductor device may be accurately predicted.

Figure 12A:
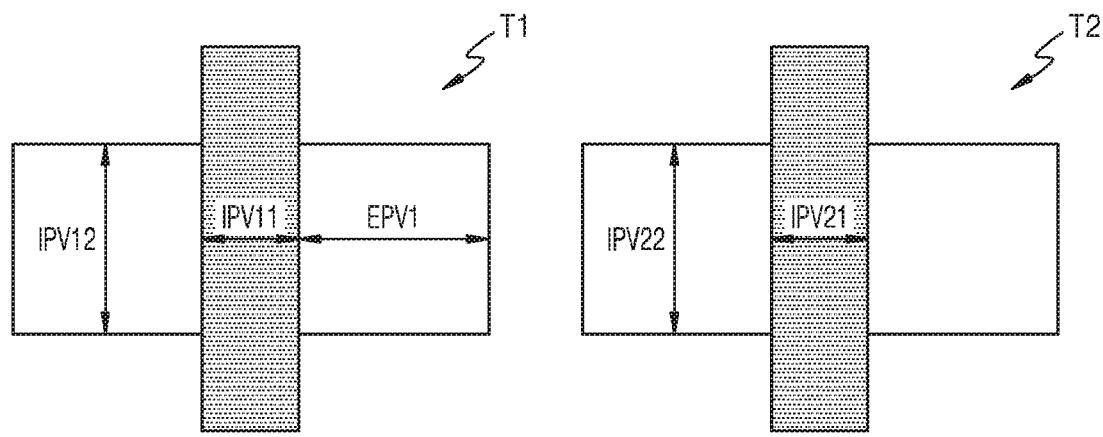
FIGS. 12A and 12B are diagrams for describing external conditions at least one example embodiment.
Figure 12B:
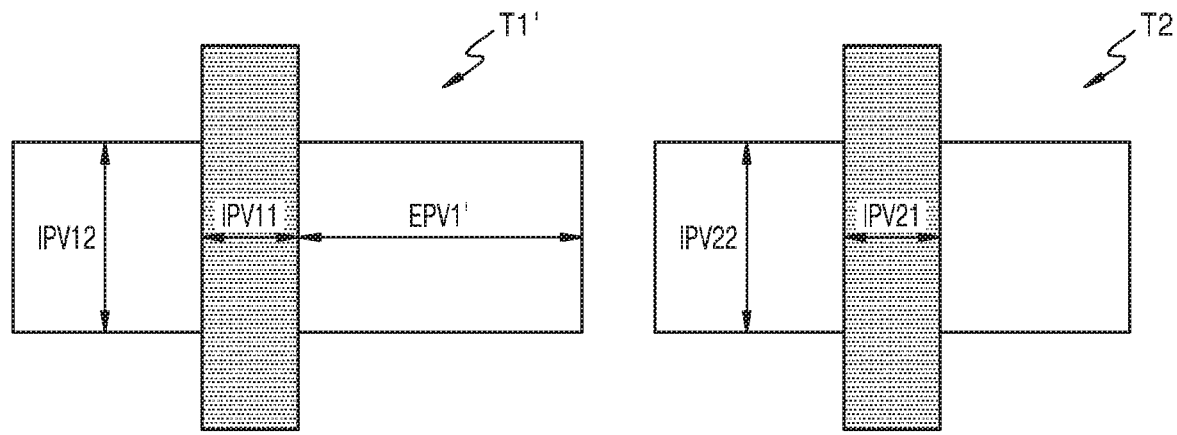
Figure 13:
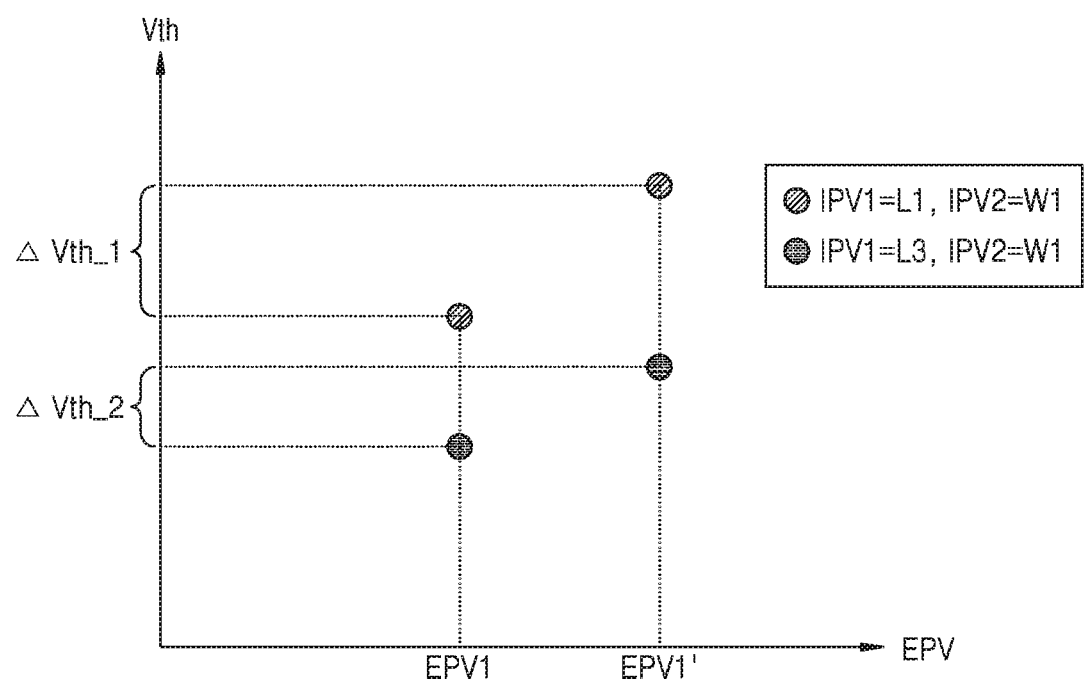
FIG. 13 is a graph for describing a variation in an electrical characteristic of a semiconductor device according to a difference among external conditions at least one example embodiment.

FIGS. 12A and 12B are diagrams for describing external conditions according to at least one example embodiment. FIG. 13 is a graph for describing a variation in an electrical characteristic of a semiconductor device according to a difference among external conditions according to at least one example embodiment. FIGS. 12A and 12B only show a difference in distances of the active area, but the method of manufacturing the integrated circuit and the computing system of the example embodiments are not limited thereto, and the same descriptions may be applied to the external conditions affecting the electrical characteristics and/or physical characteristics of the semiconductor device included in the integrated circuit.

Referring to FIGS. 12A and 12B, a first semiconductor device T1 of FIG. 12A and a first semiconductor device T1' of FIG. 12B have the same internal conditions, for example, a length of the gate line IPV11 and a width of the active area IPV12, but are different from each other in distances of the active area (EPV1 or EPV1'), wherein the distance of the active area is a distance from the gate line to an insulating layer formed to insulate from a second semiconductor device T2. In this case, the first semiconductor device T1 of FIG. 12A and the first semiconductor device T1' of FIG. 12B may have different electrical characteristics and/or physical characteristics from each other, and in order to simulate the electrical characteristics and/or physical characteristics of the first semiconductor device T1 of FIG. 12A and the first semiconductor device T1' of FIG. 12B, external conditions, as well as the internal conditions, may be reflected.

Referring to FIGS. 12A, 12B, and 13, when the internal conditions are the same as each other and the distance of the active area, that is, the external condition, changes from a first value EPV1 of the distance of the active area to a second value EPV1' of the distance of the active area, a threshold voltage that is the electrical characteristic of the semiconductor device may increase. However, a change in the amount of the threshold voltage of the semiconductor device may vary depending on values of the internal conditions. For example, a threshold voltage increase rate ($\Delta$Vth_1) in a case where the length of the gate line, that is, the value of the first internal process variable IPV1, is L1 and the width of the active area, that is, the value of the second internal process variable IPV2, is W1, may be greater than a threshold voltage increase rate ($\Delta$Vth_2) in a case where the length of the gate line as the first internal process variable IPV1 is L3 and the width of the active areas the internal process variable IPV2 is W1. That is, the variation in the electrical characteristics and/or physical characteristics of the semiconductor device due to the variation in the external condition may be affected by the value of the internal process variable. Therefore, the first to (k−1)-th external model formulae shown in FIG. 11A may be expressed as functions about the internal process variables (IPV1 and IPV2).

Figure 14:
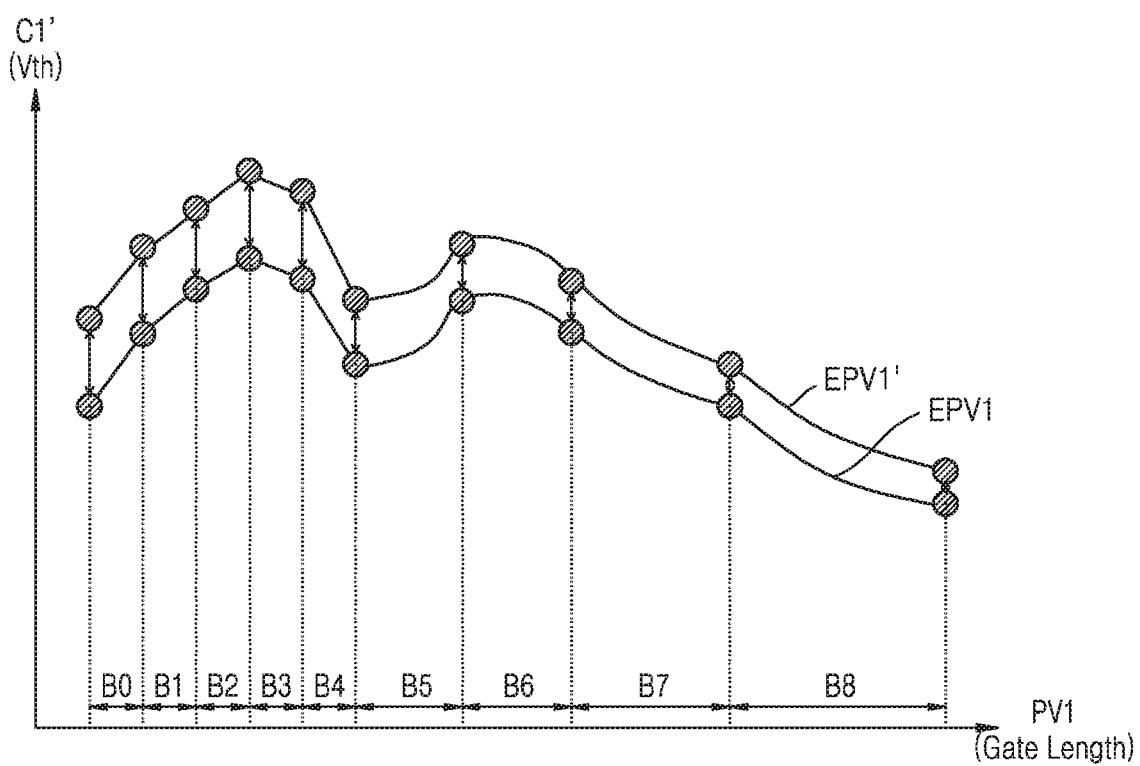
FIG. 14 is a graph for describing a variation in an electrical characteristic of a semiconductor device predicted according to change in external conditions of the semiconductor device at least one example embodiment.

FIG. 14 is a graph for describing a variation in an electrical characteristic of a semiconductor device predicted according to change in external factors of the semiconductor device according to at least one example embodiment. The graph of FIG. 14 illustrates a variation in electrical characteristics and/or physical characteristics according to internal conditions and/or external conditions included in a region A of FIG. 7. Referring to FIG. 14, each point in the graph may be obtained by substantially measuring a variation in, for example, the threshold voltage of the semiconductor device according to the length of the gate line, that is, the first process variable IPV1. A curve connecting the points in the graph shows the electrical characteristic value of the semiconductor device, which is simulated by using extracted interval model parameters.

In at least one example embodiment, the electrical characteristics and/or physical characteristics of the semiconductor device may be changed when the external condition changes from the first value EPV1 to the second value EPV1' when the internal conditions are constant, but the example embodiments are not limited thereto. For example, when the length of the gate line as the internal condition is constant, the threshold voltage that is an electrical characteristic of the semiconductor device may increase as the length of the active area changes from the first value EPV1 to the second value EPV1'. However, a degree of the variation in the electrical characteristics and/or physical characteristics of the semiconductor device may be changed according to the value of the length of the gate line IPV1, that is, the internal condition.

The computing system according to at least one example embodiment predicts the electrical characteristics and/or physical characteristics of the semiconductor device by reflecting not only the physical/structural characteristics of the semiconductor device, but also reflecting the relation with an adjacent semiconductor device, and thus, the electrical characteristics and/or physical characteristics of the semiconductor device may be accurately predicted. Therefore, according to the method of manufacturing the integrated circuit, the simulation operation may be efficiently performed.

While various example embodiments of the inventive concepts have been particularly shown and described with reference to the above example embodiments, it will be understood that various changes in form and details may be made therein without departing from the spirit and scope of the following claims.

What is claimed is:

1. A method of manufacturing an integrated circuit in which a semiconductor device is provided, the method comprising:
    simulating, using at least one processor, characteristics of the semiconductor device according to at least one process variable, using a model parameter file including a plurality of model parameters, the plurality of model parameters corresponding to at least one function associated with the at least one process variable;
    generating, using the at least one processor, semiconductor device layout data based on a result of the simulation, the generating the semiconductor device layout data including performing at least one of a synthesis operation or a place and routing operation to define the integrated circuit based on the result of the simulation; and
    manufacturing the integrated circuit according to a semiconductor device layout based on the semiconductor device layout data.

2. The method of claim 1, wherein the simulating of the characteristics comprises:
    receiving information related to the at least one process variable;
    determining model parameters corresponding to a value of the at least one process variable from the plurality of model parameters; and
    outputting characteristic data corresponding to the value of the at least one process variable based on the determined model parameters, the characteristic data including electrical characteristics or physical characteristics of the semiconductor device.

3. The method of claim 1, further comprising:
    modeling, using the at least one processor, the semiconductor device; and generating, using the at least one processor, the model parameter file including the plurality of model parameters based on results of the modeling the semiconductor device, and the generating of the model parameter file including,
receiving characteristic data of a plurality of semiconductor devices, the characteristic data corresponding to internal conditions of the plurality of semiconductor devices,
extracting point model parameters corresponding respectively to the internal conditions of the plurality of semiconductor devices based on each internal condition in each of the plurality of semiconductor devices and a value of the characteristic data, and
extracting interval model parameters corresponding to intervals among different internal conditions associated with each of the plurality of semiconductor devices based on the point model parameters.

4. The method of claim 3, wherein the extracting of the interval model parameters comprises determining an accuracy of the point model parameters.

5. The method of claim 3, wherein the extracting of the interval model parameters comprises extracting the interval model parameters corresponding to intervals among the different internal conditions based on the point model parameters and a desired regression equation.

6. The method of claim 1, wherein the at least one process variable comprises:
an internal process variable corresponding to a physical characteristic and a structural characteristic in the semiconductor device; and
an external process variable corresponding to a physical characteristic and a structural characteristic generated due to a peripheral environment of the semiconductor device.

7. The method of claim 6, wherein the simulating of the characteristics comprises:
receiving information related to the internal process variable and information related to the external process variable;
determining internal model parameters corresponding to a value of the internal process variable from among the plurality of model parameters;
determining external model parameters based on a value of the internal process variable, a value of the external process variable, and external model formulae; and
outputting characteristic data including electrical characteristics of the semiconductor device based on the determined external model parameters, the electrical characteristics corresponding to the value of the internal process variable and the value of the external process variable,
wherein the external model formulae include formulae for converting the internal model parameters into the external model parameters, and at least one function regarding the internal process variable and the external process variable.

8. The method of claim 6, wherein the internal process variable comprises at least one of a length of a gate line in a transistor and a width of an active area of the transistor.

9. The method of claim 6, wherein the external process variable comprises a physical characteristic and a structural characteristic of the semiconductor device, the physical characteristic and the structural characteristic contributing to a local layout effect caused by another semiconductor device arranged around the semiconductor device.

10. The method of claim 1, wherein
the model parameter file comprises a plurality of model parameter sets each comprising a plurality of model parameters; and
the simulating of the characteristics comprises selecting one of the plurality of model parameter sets according to a range of a value of the received process variable.

11. A method of manufacturing an integrated circuit, the method comprising:
generating, using at least one processor, a model parameter file including a plurality of model parameters based on results of modeling a semiconductor device included in the integrated circuit, the generating the model parameter file including,
receiving first characteristic data of a first semiconductor device, the first characteristic data corresponding to a first internal condition of the first semiconductor device,
receiving second characteristic data of a second semiconductor device, the second characteristic data corresponding to a second internal condition of the second semiconductor device,
extracting a plurality of first point model parameters corresponding to the first internal condition,
extracting a plurality of second point model parameters corresponding to the second internal condition based on the first internal condition, the second internal condition, a value of the first characteristic data, and a value of the second characteristic data, and
calculating interval model parameters corresponding to an interval between the first internal condition and the second internal condition based on the plurality of first point model parameters and the plurality of second point model parameters;
simulating, using the at least one processor, characteristics of the semiconductor device according to a received process variable based on the model parameter file;
generating, using the at least one processor, semiconductor device layout data based on a result of the simulation; and
manufacturing the integrated circuit according to a semiconductor device layout based on the semiconductor device layout data.

12. The method of claim 11, further comprising:
calculating, using the at least one processor, the interval model parameters; and
determining, using the at least one processor, an accuracy of the plurality of first point model parameters and the plurality of second point model parameters.

13. The method of claim 11, wherein the calculating of the interval model parameters comprises:
calculating the interval model parameters corresponding to a condition interval between the first internal condition and the second internal condition based on the plurality of first point model parameters, the plurality of second point model parameters, and a desired regression equation.

14. The method of claim 11, wherein the first internal condition and the second internal condition are adjacent to each other.

15. A computing system for designing an integrated circuit, the computing system comprising:
a memory configured to store a circuit simulation program for extracting characteristics of a semiconductor device included in the integrated circuit, and a model parameter file including a plurality of model parameters, the plurality of model parameters including a plurality of point model parameters that are constants and a plurality of interval model parameters provided as functions related to at least one process variable; and at least one processor configured to access the memory and to execute the circuit simulation program, the circuit simulation program causing the at least one processor to, receive information related to the at least one process variable, determine a model parameter corresponding to a value of the at least one process variable from the model parameter file, output characteristic data including characteristics of the semiconductor device based on the determined model parameter, and generate semiconductor device layout data based on the output characteristic data, the generating the semiconductor device layout data including performing at least one of a synthesis operation or a place and routing operation to define the integrated circuit.

16. The computing system of claim 15, wherein the circuit simulation program causes the at least one processor to:

obtain the point model parameters from the model parameter file as a plurality of model parameter sets; and obtain the interval model parameters from the model parameter file as a plurality of model formulae, the obtaining the interval model parameters including, selecting some of the plurality of model parameter sets, selecting one of the plurality of model formulae based on the received information about the at least one process variable, and outputting the characteristic data based on the selected model parameter sets and the selected model formula.

17. The computing system of claim 16, wherein the at least one process variable comprises:

an internal process variable corresponding to a physical characteristic and a structural characteristic in the semiconductor device; and an external process variable corresponding to a physical characteristic and a structural characteristic generated due to a peripheral environment of the semiconductor device.

18. The computing system of claim 17, wherein the plurality of model formulae comprise:

a plurality of internal model formulae including functions regarding the internal process variable; and a plurality of external model formulae including functions regarding the internal process variable and the external process variable.

19. The computing system of claim 18, wherein the circuit simulation program causes the at least one processor to:

determine an internal model parameter corresponding to a value of the internal process variable;

select one of the plurality of external model formulae based on the value of the internal process variable and a value of the external process variable;

determine an external model parameter based on the internal model parameter, the value of the external process variable, and the external model formula; and output the characteristic data based on the determined external model parameter, the characteristic data including the characteristics of the semiconductor device, the characteristics corresponding to the value of the internal process variable and the value of the external process variable.

20. The computing system of claim 17, wherein the external process variable comprises:

a physical characteristic and a structural characteristic of the semiconductor device, the physical characteristic and the structural characteristic corresponding to a local layout effect caused by another semiconductor device arranged around the semiconductor device.

\* \* \* \* \*